Dec. 22, 1964   O. R. SCHULER   3,161,944
COMBINATION FIN-FORMING AND FIN-ATTACHING
METHODS AND APPARATUS
Filed July 10, 1961   25 Sheets-Sheet 1

INVENTOR.
OTTO R. SCHULER
BY Whittemore, Hulbert
Belknap
ATTORNEYS.

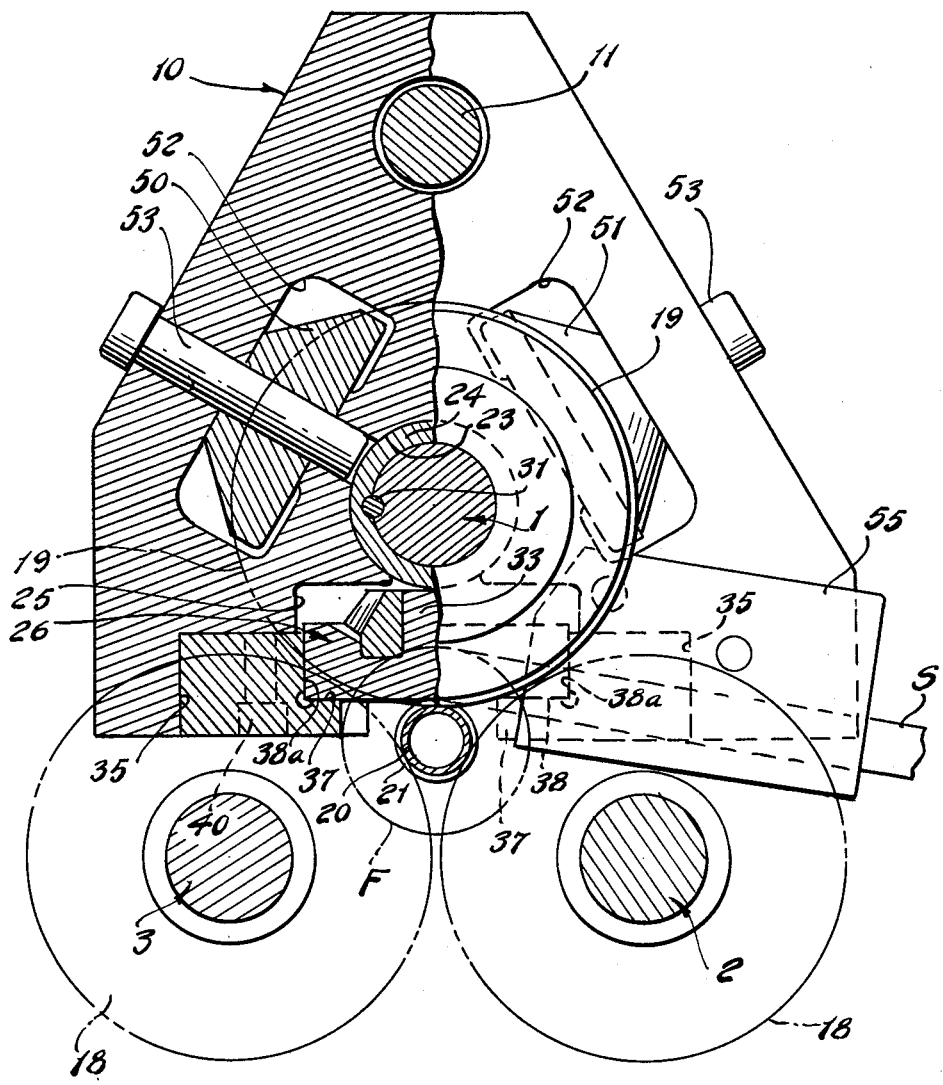

Dec. 22, 1964  O. R. SCHULER  3,161,944
COMBINATION FIN-FORMING AND FIN-ATTACHING
METHODS AND APPARATUS
Filed July 10, 1961  25 Sheets-Sheet 3
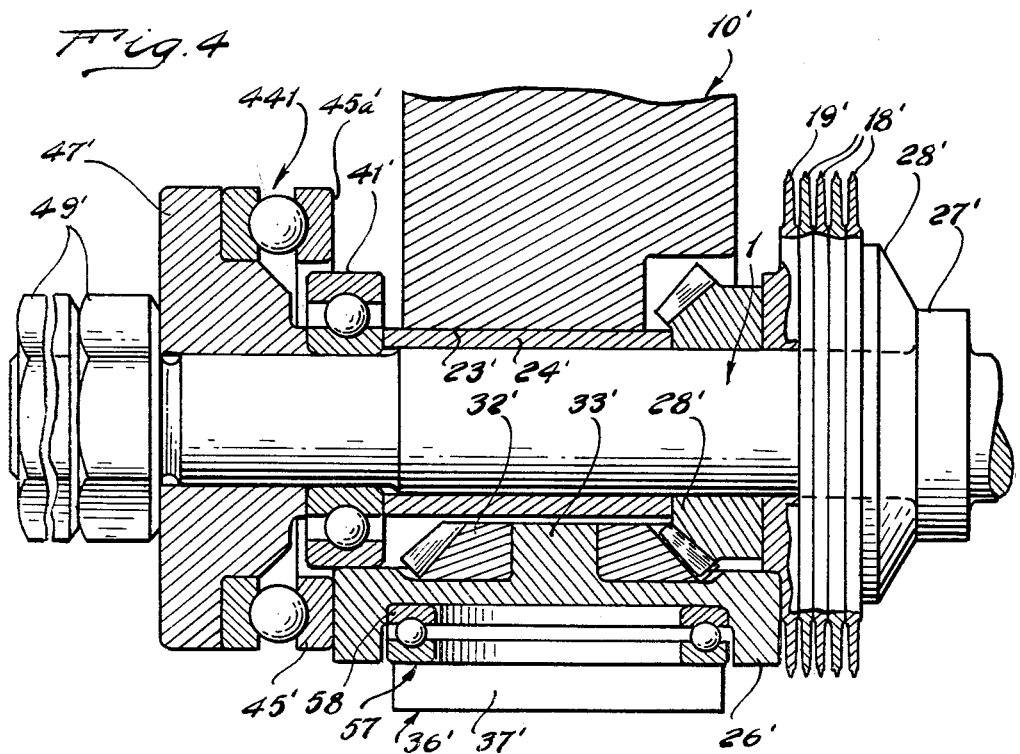
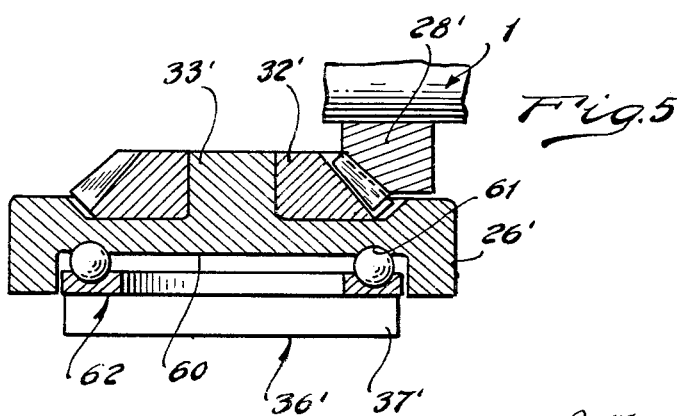
INVENTOR.
OTTO R. SCHULER
BY
ATTORNEYS INVENTOR.
OTTO R. SCHULER
BY Whittemore, Hulbert
Belknap
ATTORNEYS.

Dec. 22, 1964   O. R. SCHULER   3,161,944
COMBINATION FIN-FORMING AND FIN-ATTACHING
METHODS AND APPARATUS
Filed July 10, 1961   25 Sheets-Sheet 5
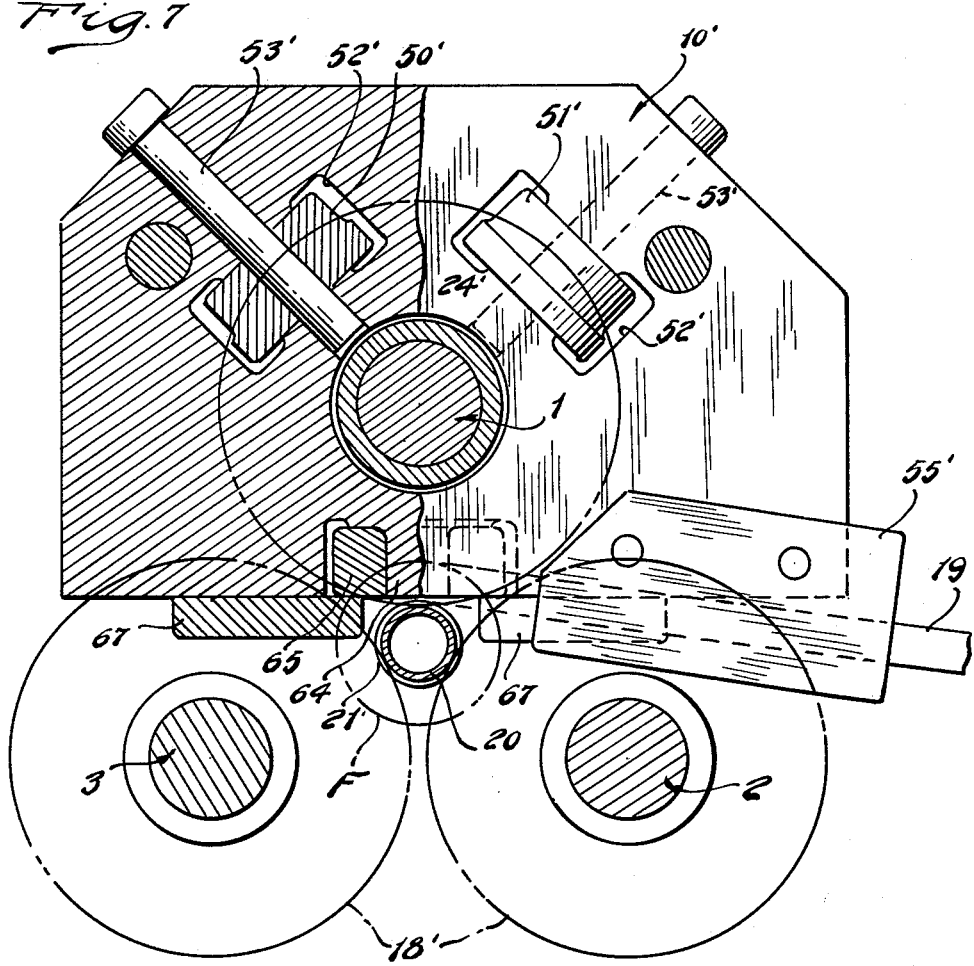
Fig.7
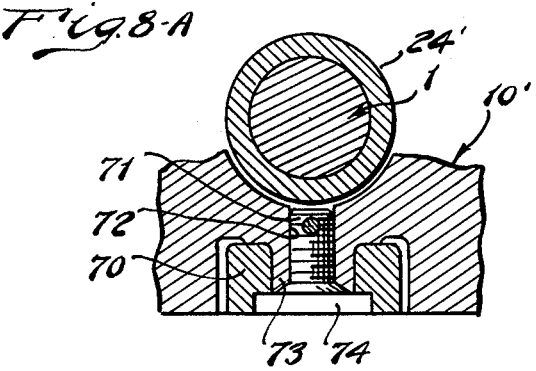
Fig.8-A
INVENTOR.
OTTO R. SCHULER
BY
ATTORNEYS.

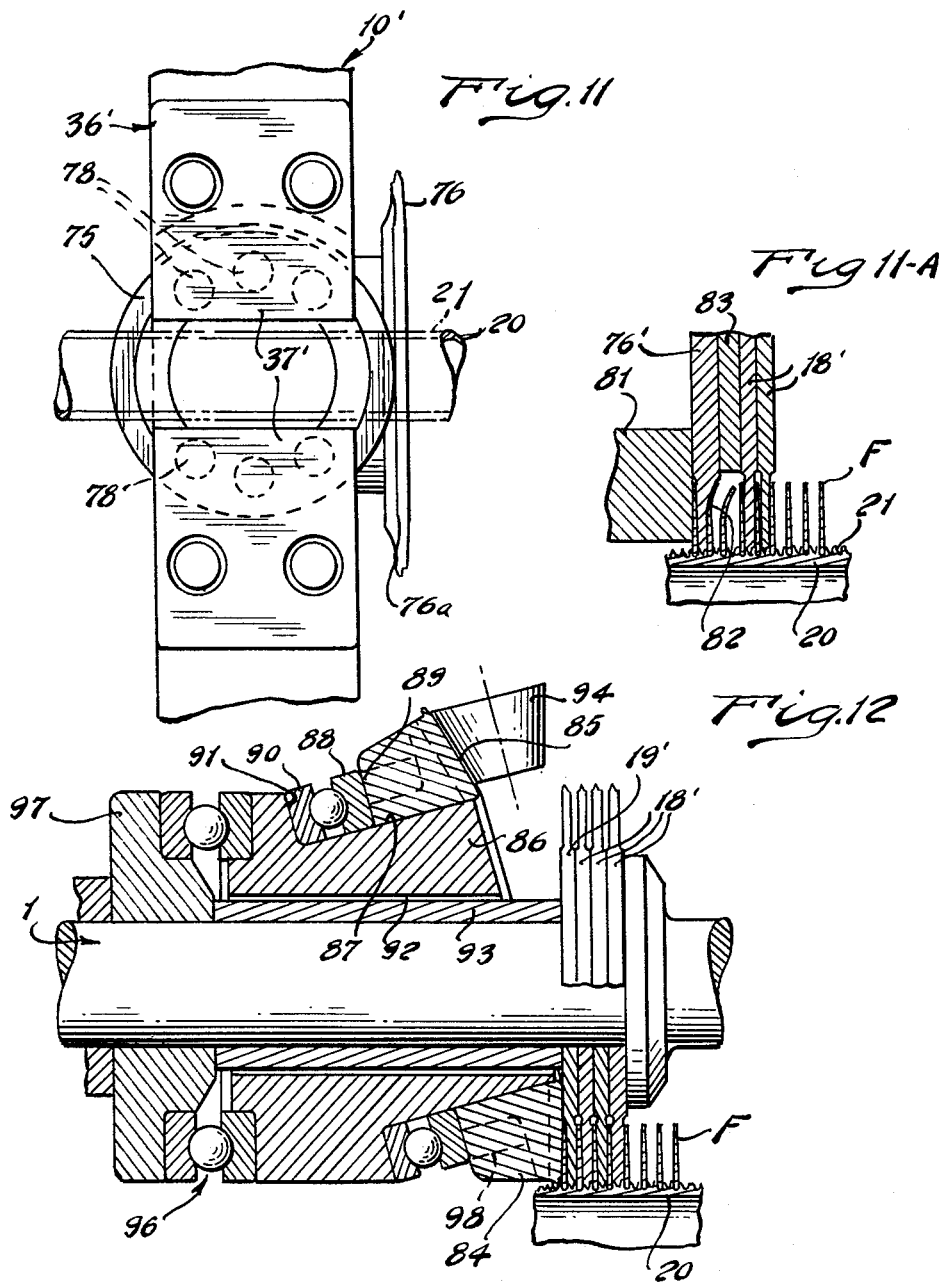

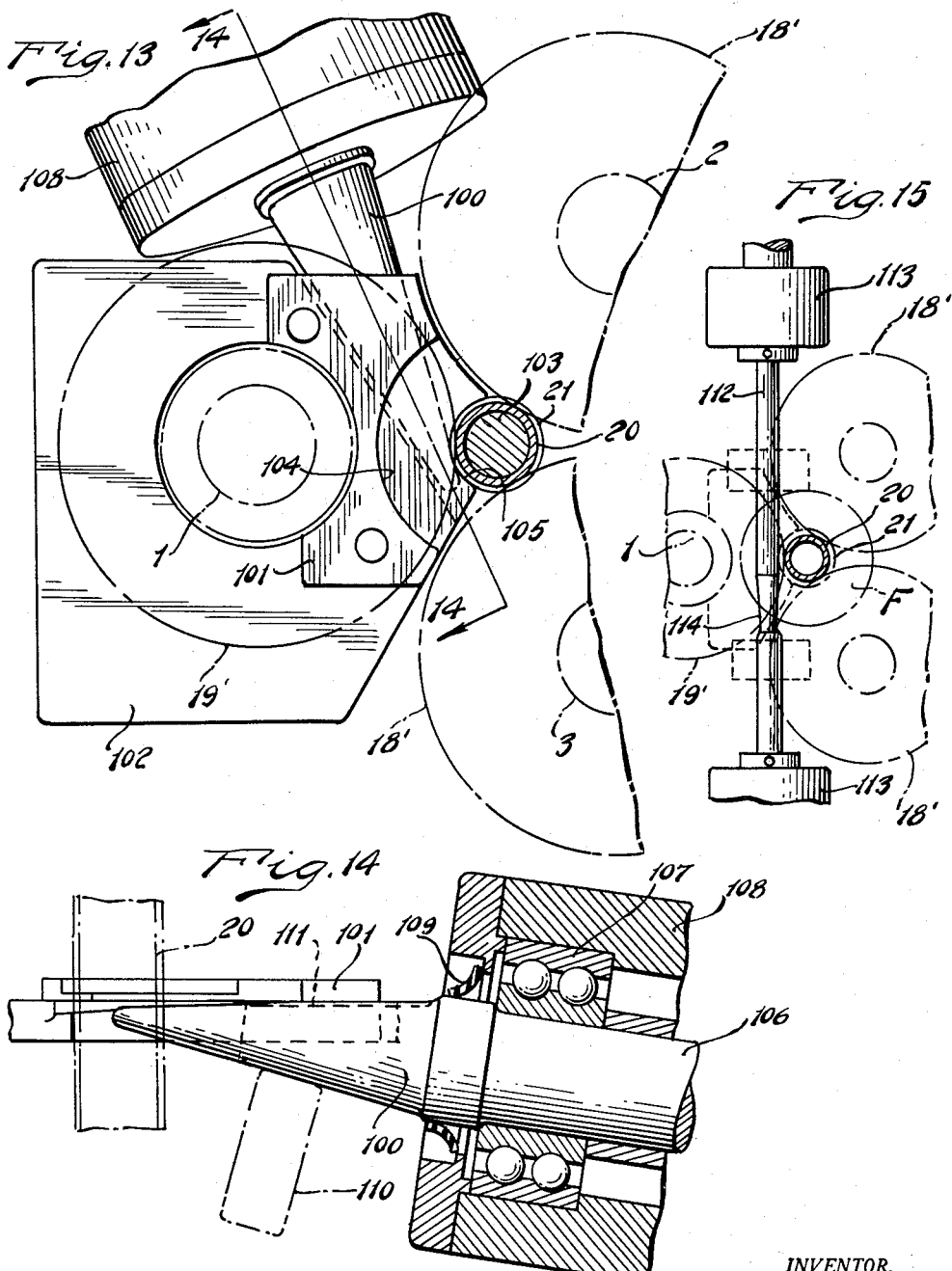

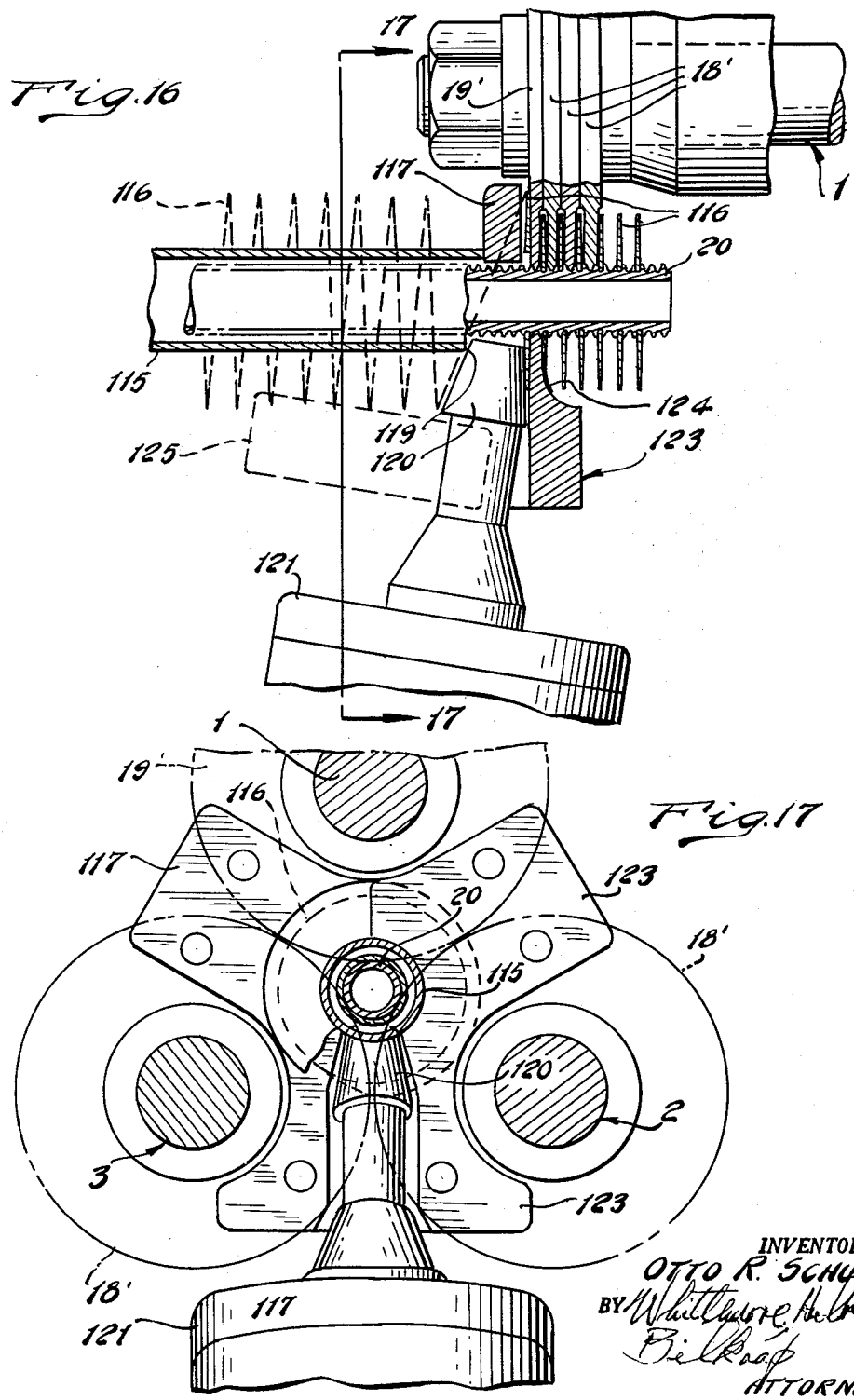

INVENTOR.
OTTO R. SCHULER
BY
ATTORNEYS

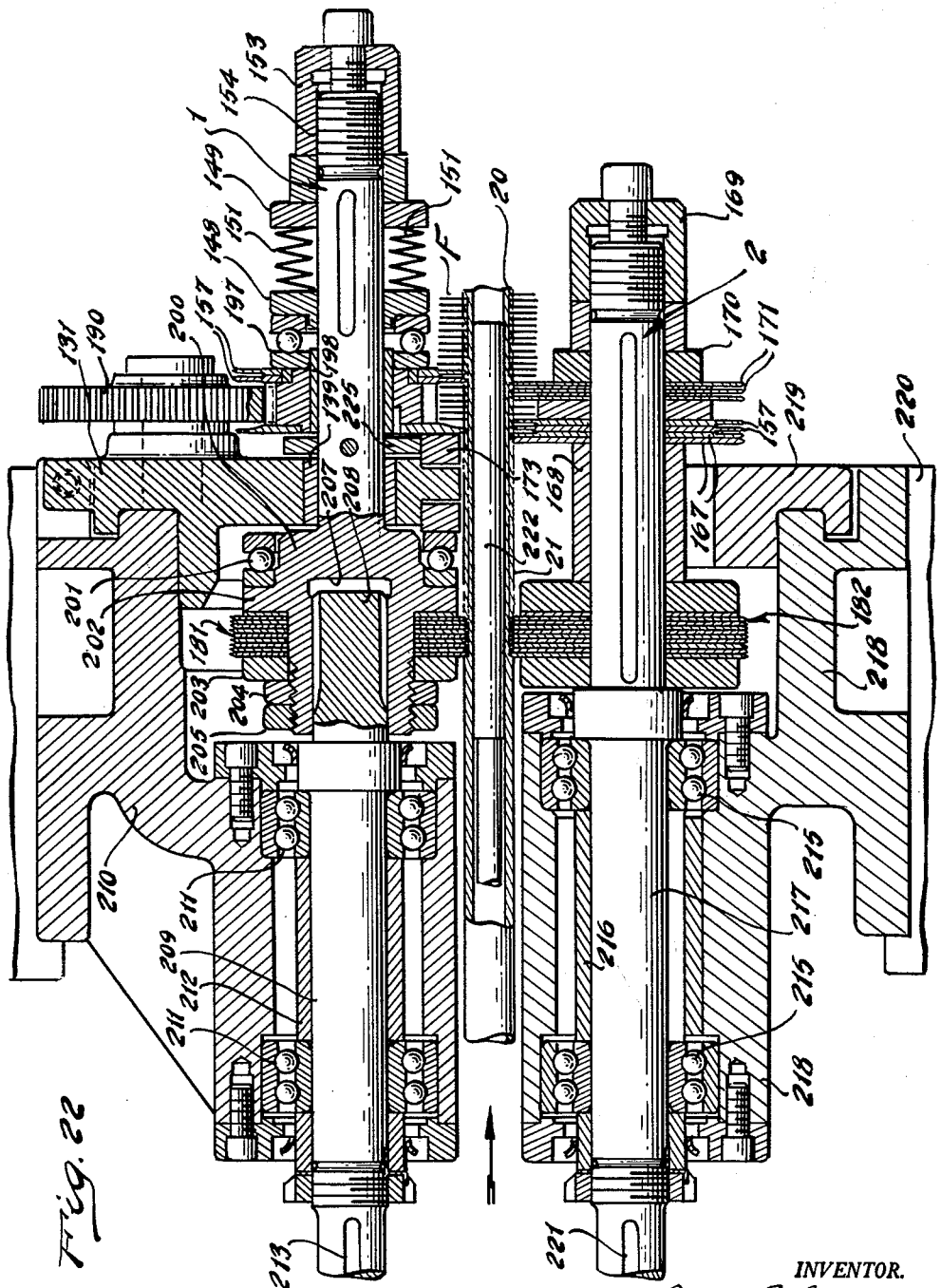

Dec. 22, 1964     O. R. SCHULER     3,161,944
COMBINATION FIN-FORMING AND FIN-ATTACHING
METHODS AND APPARATUS
Filed July 10, 1961     25 Sheets-Sheet 15
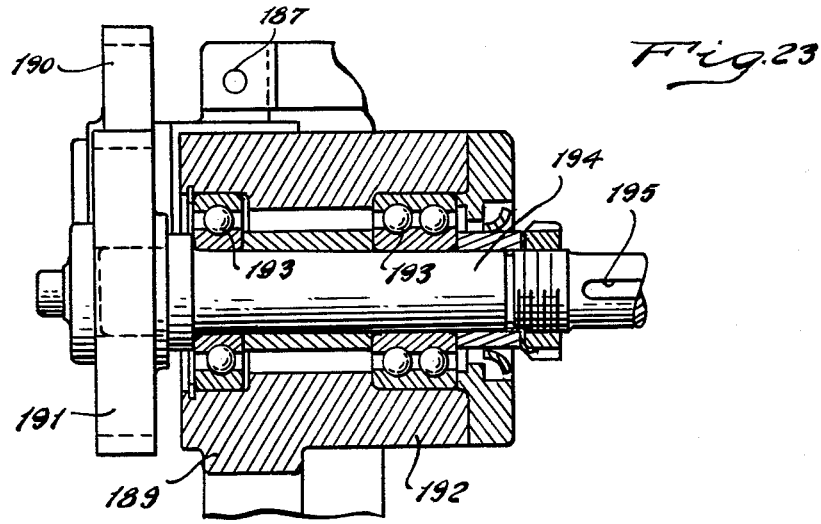
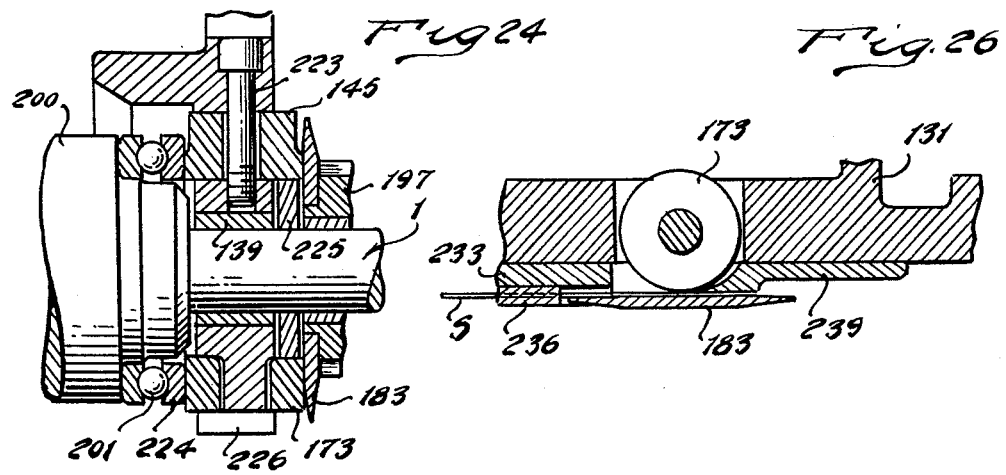
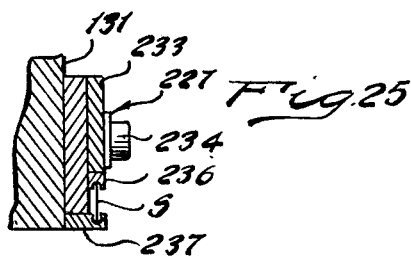
INVENTOR.
OTTO R. SCHULER
BY
ATTORNEYS Dec. 22, 1964 O. R. SCHULER 3,161,944
COMBINATION FIN-FORMING AND FIN-ATTACHING
METHODS AND APPARATUS
Filed July 10, 1961 25 Sheets-Sheet 16
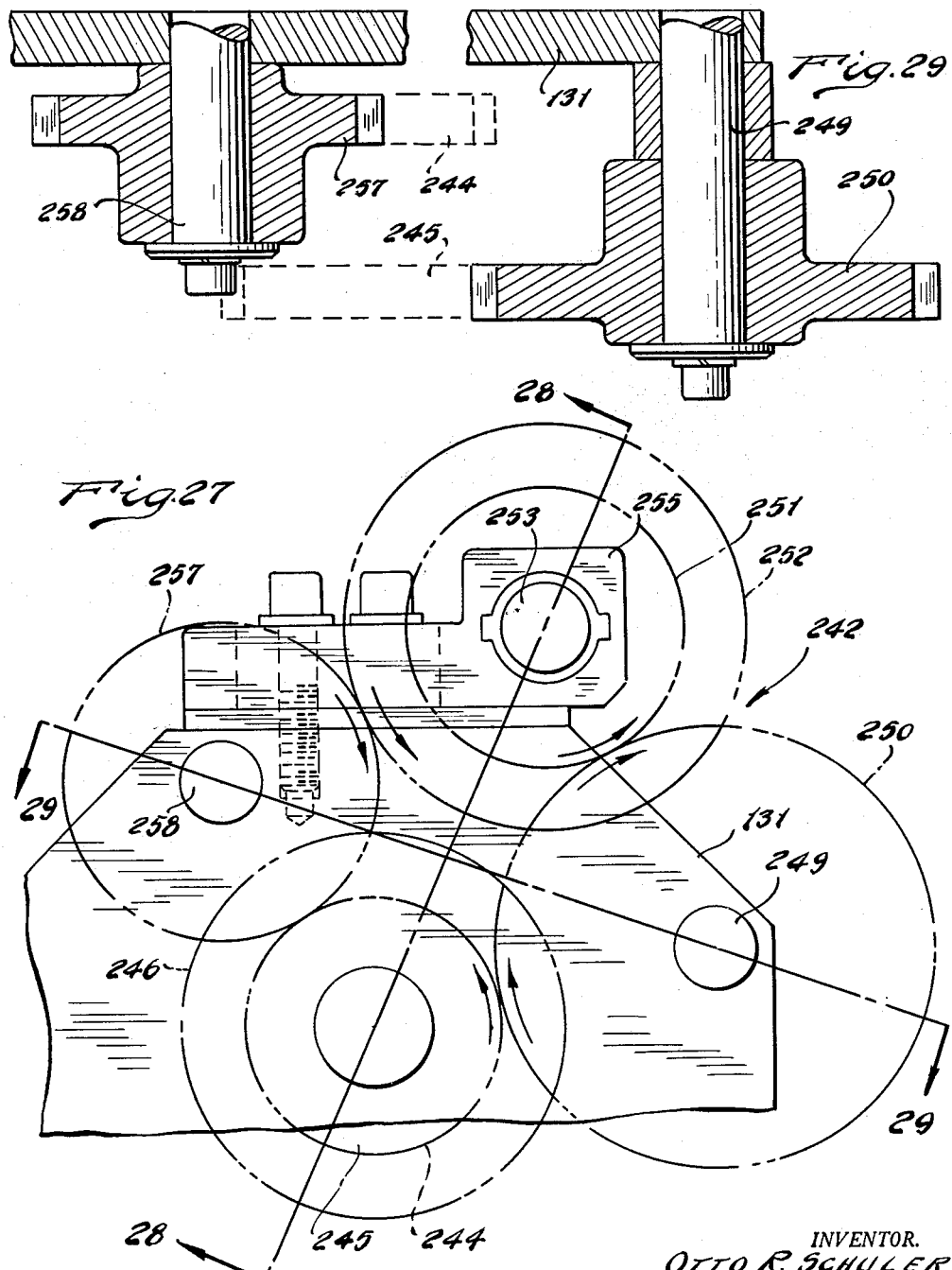
INVENTOR.
OTTO R. SCHULER
BY
ATTORNEYS

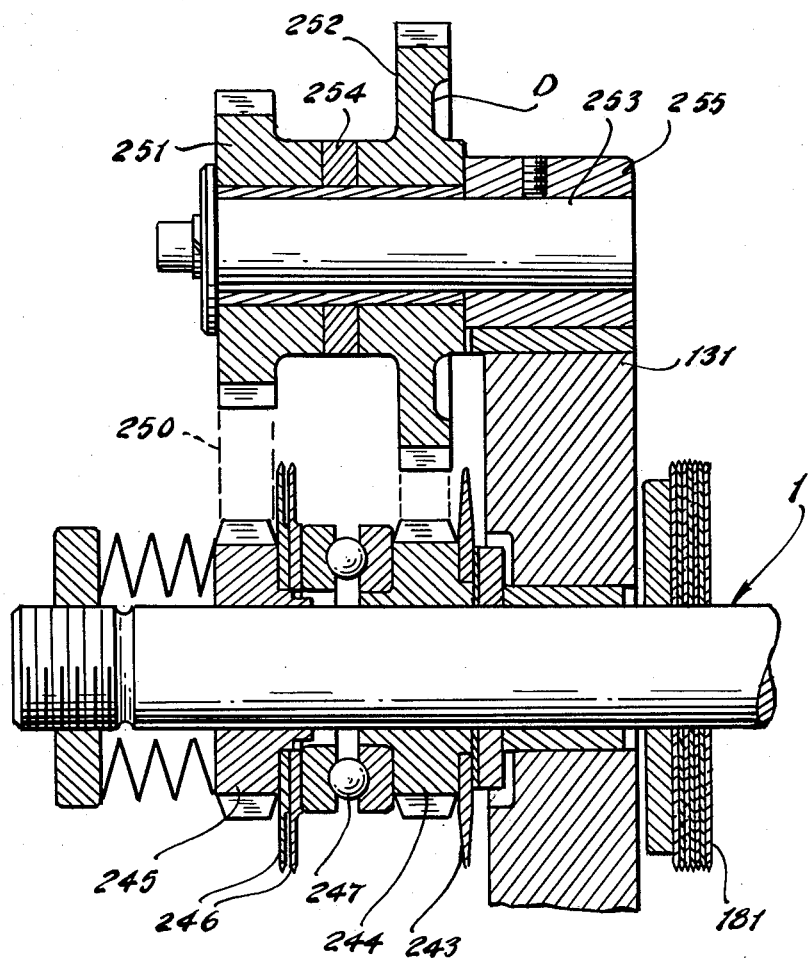

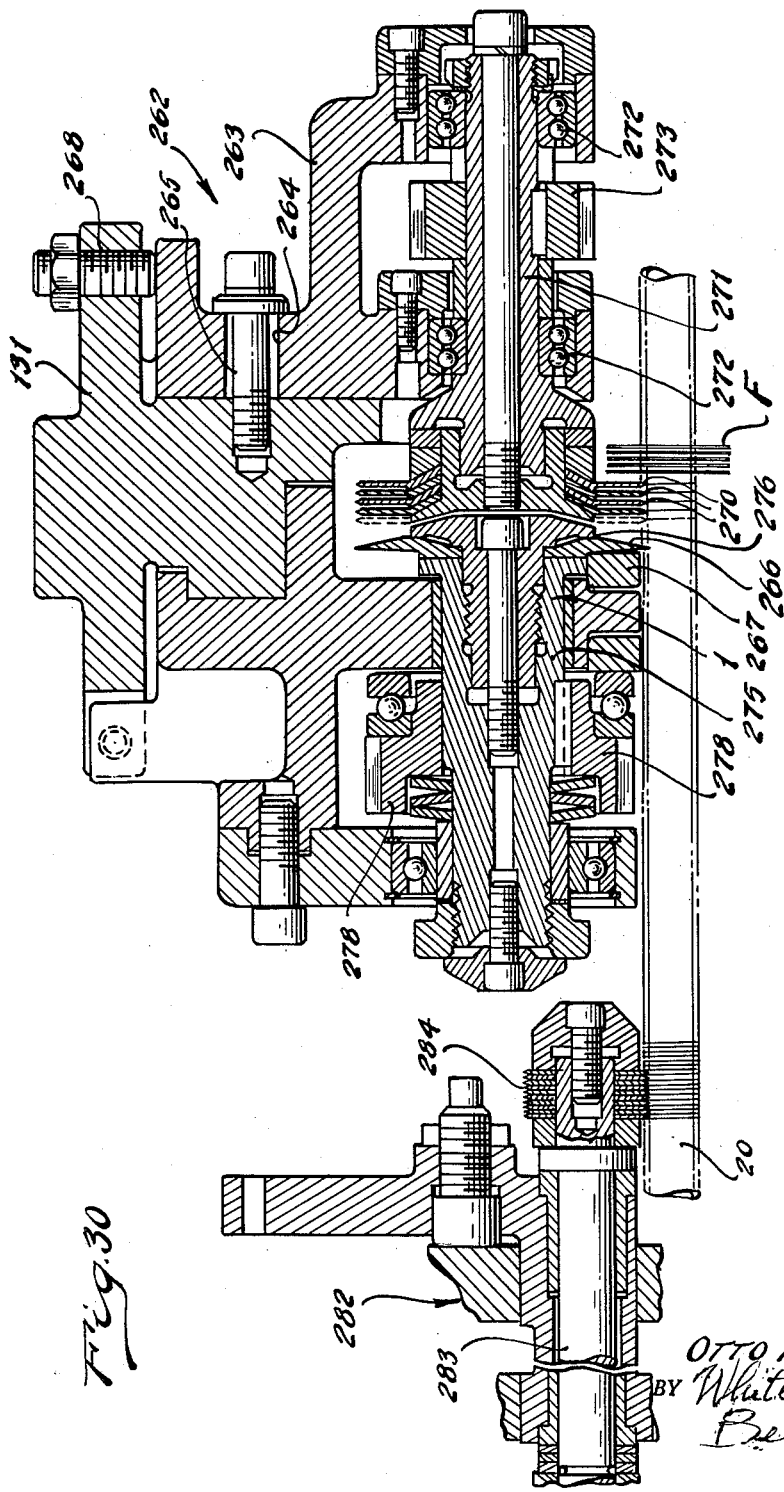

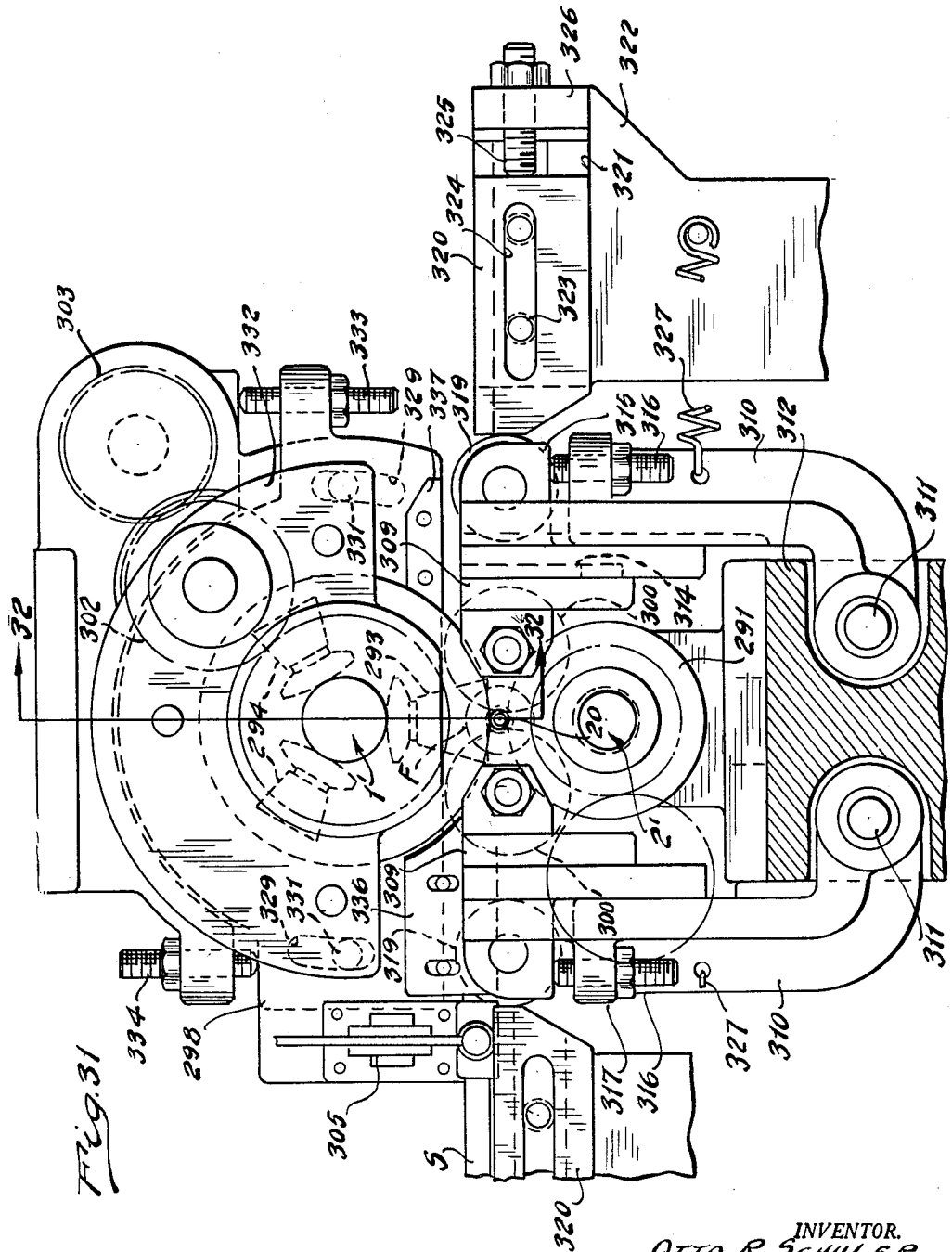

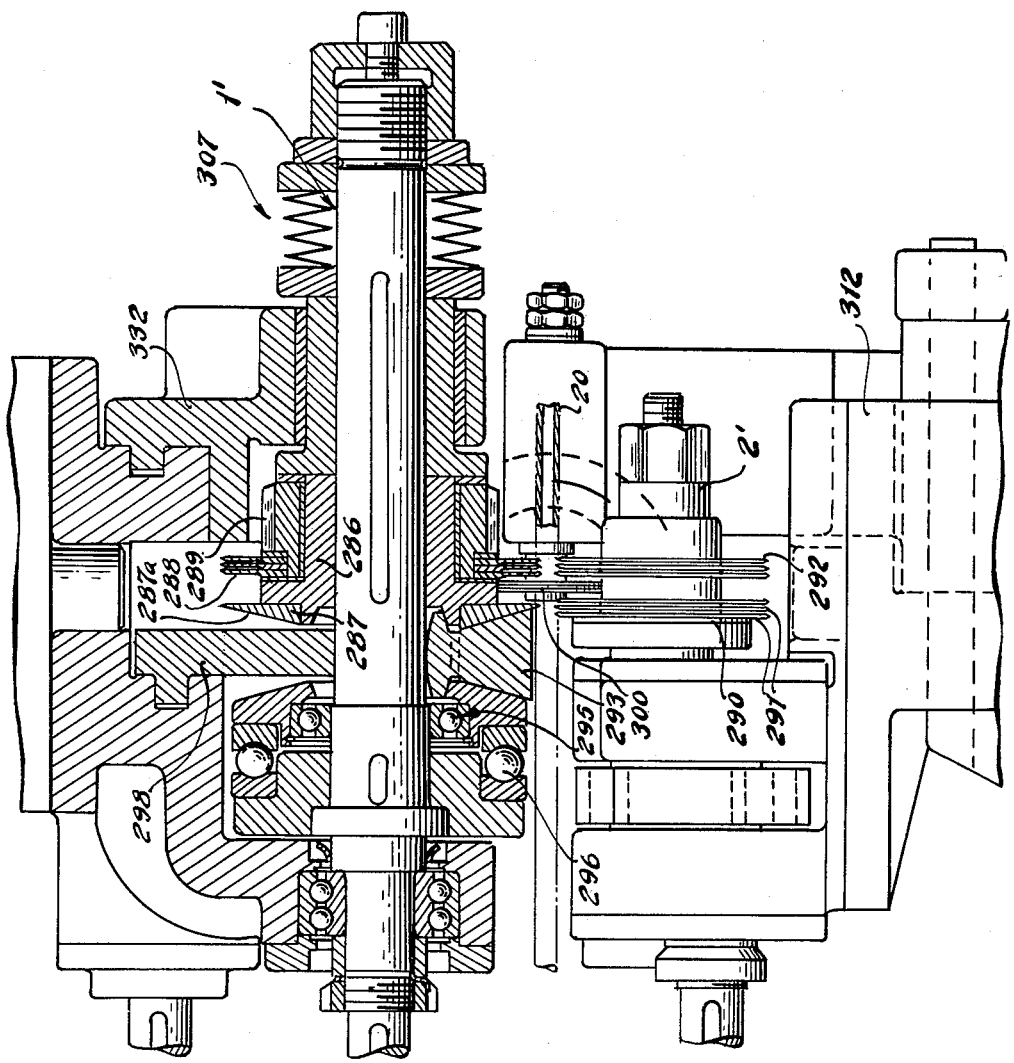

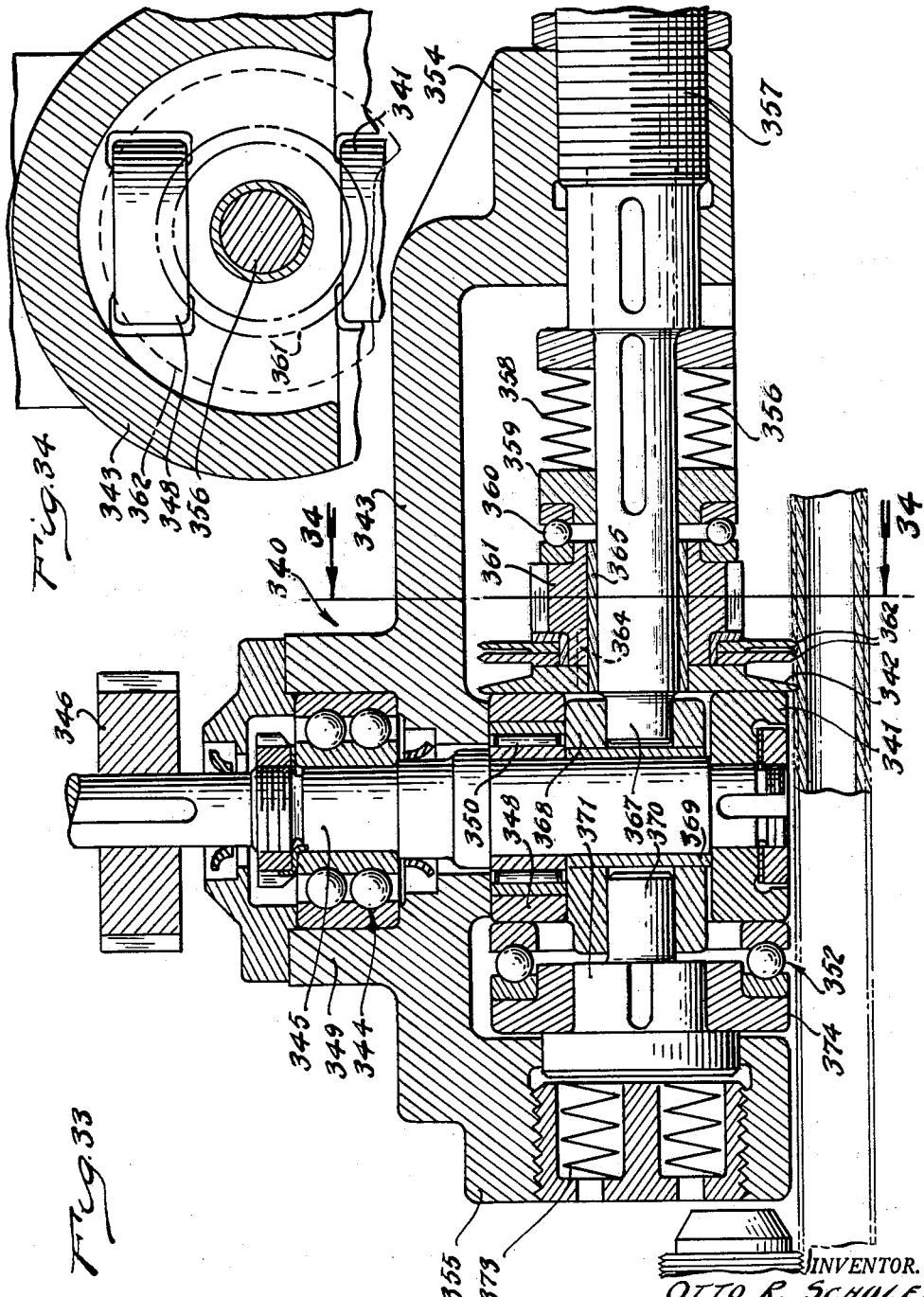

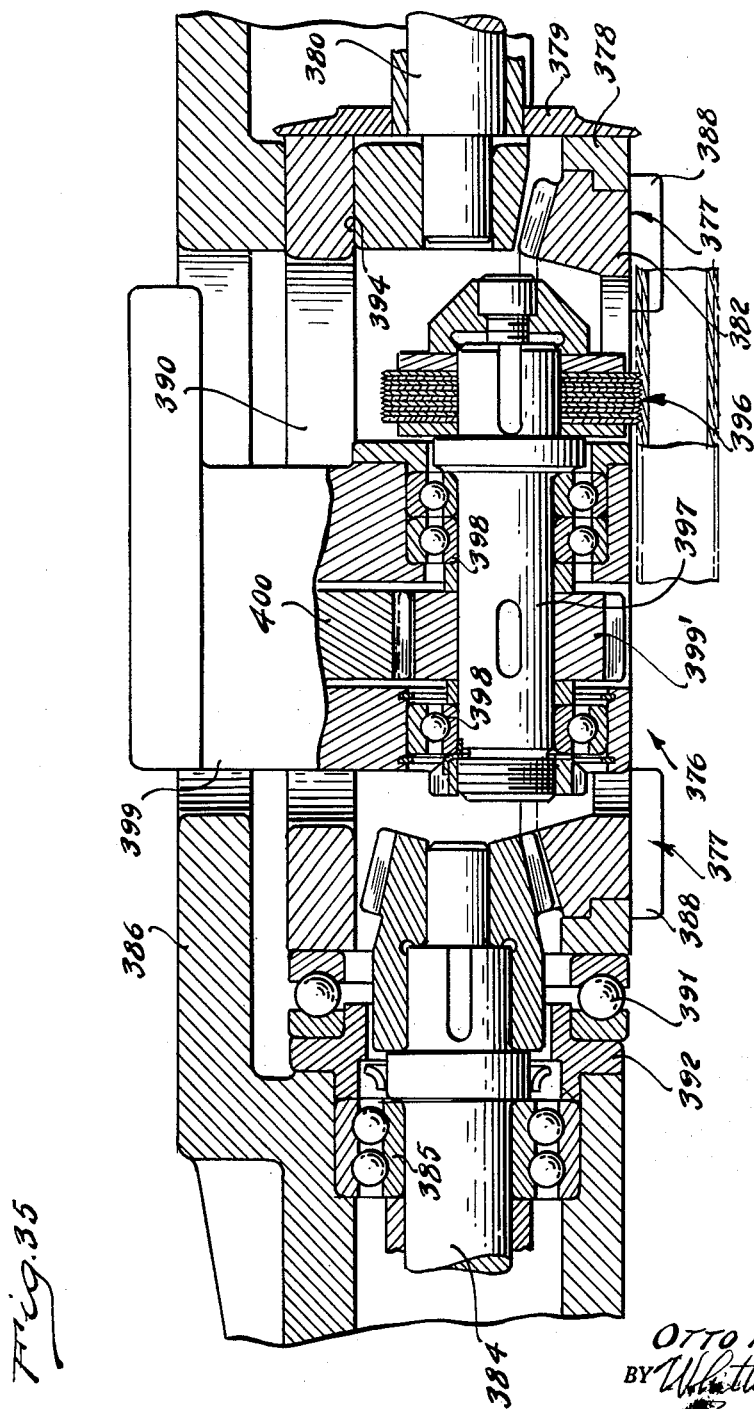

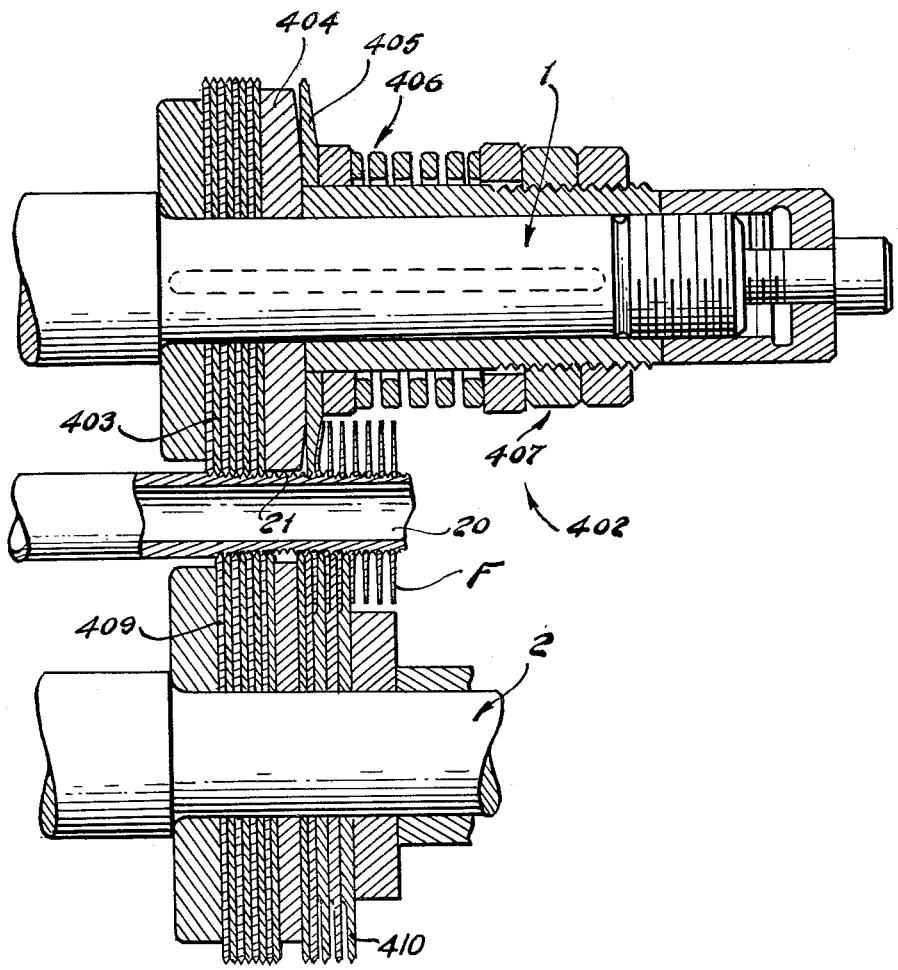

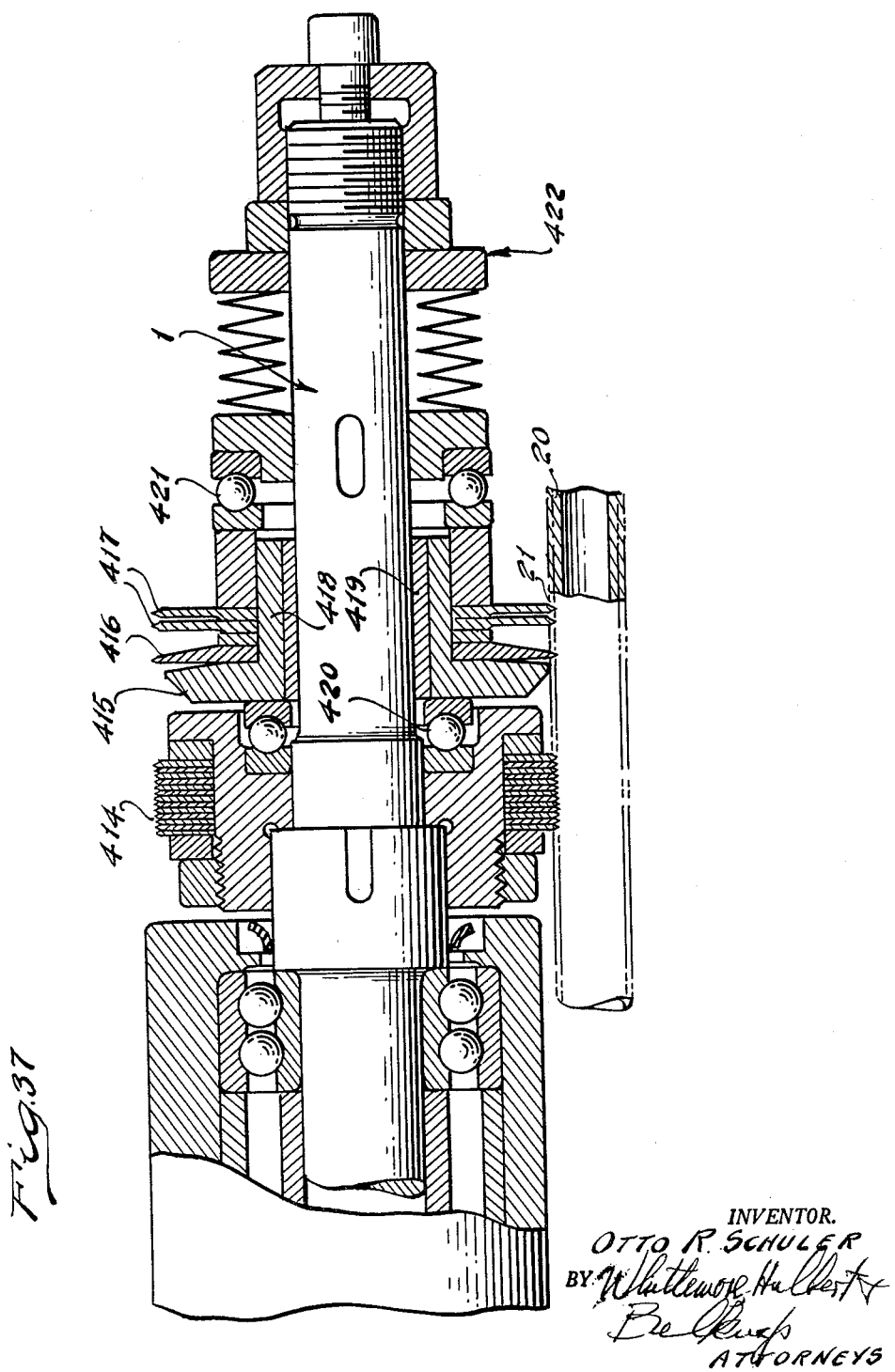

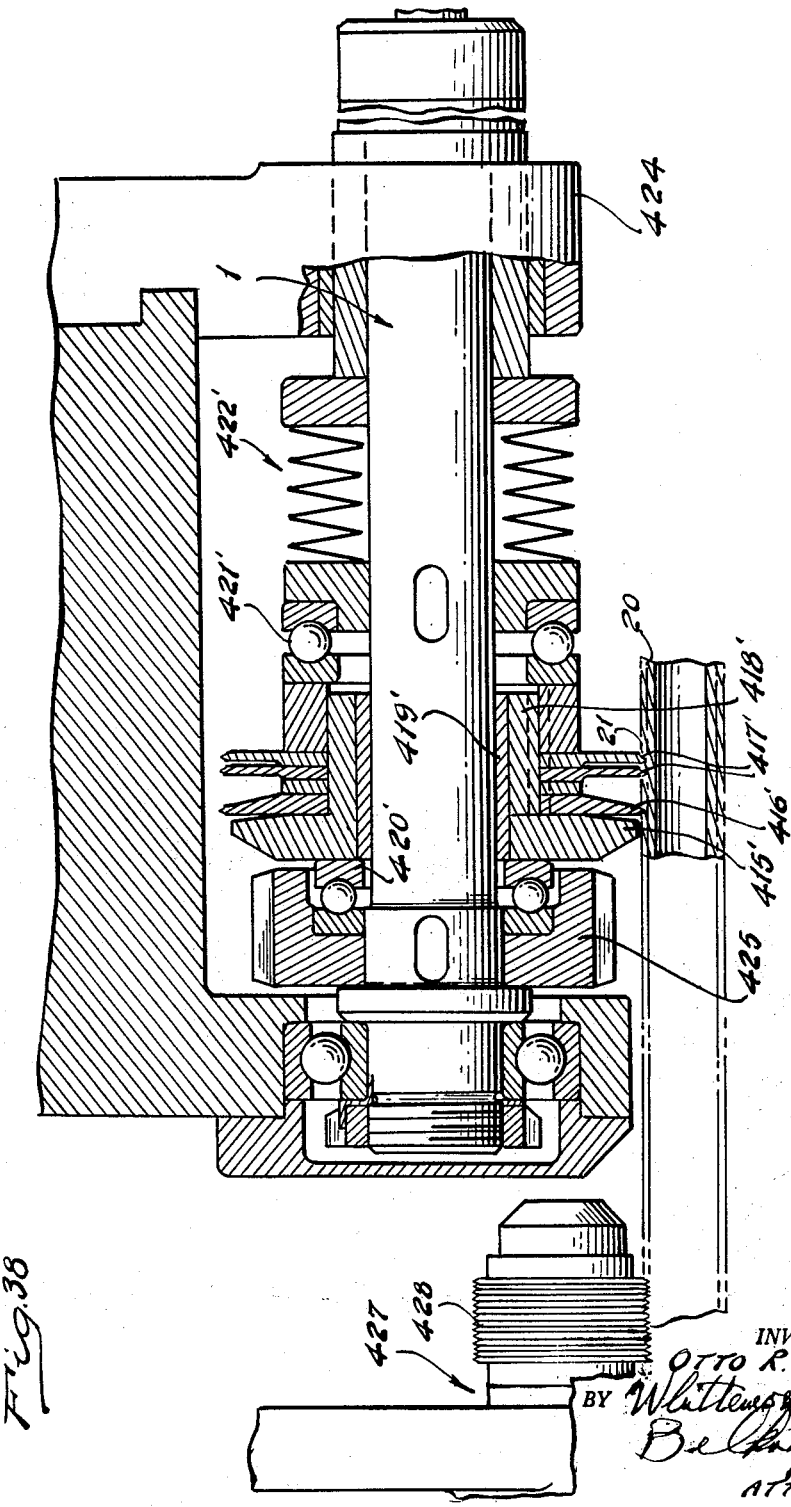

United States Patent Office 3,161,944
Patented Dec. 22, 1964

3,161,944
COMBINATION FIN-FORMING AND FIN-ATTACHING METHODS AND APPARATUS
Otto R. Schuler, Detroit, Mich., assignor to Calumet & Hecla, Inc., Allen Park, Mich., a corporation of Michigan
Filed July 10, 1961, Ser. No. 122,703
17 Claims. (Cl. 29—33)

The present invention relates to improved apparatus for applying fin material to hollow tubes, being directed along the same general lines as the invention disclosed and claimed in my copending application, Ser. No. 839,-770, filed September 14, 1959, which is a continuation in-part of my copending application, Ser. No. 734,573, filed May 12, 1958, now abandoned. The present application is a continuation-in-part of Ser. No. 839,770.

In many of the embodiments of the invention herein shown and described, the fin is specially preformed as to cross-section and attached as a wound coil on a grooved tube, coming to the latter directly from a straight strip of the fin material. For these purposes a novel arrangement of coacting, special fin preforming roll and disc member is employed. It is also contemplated that a pre-corrugated fin may be employed, for example of the type shown in my application, Serial No. 839,770. This is particularly the case if very high fins (i.e., of relatively great radial width) or tapered fins of hard material are to be applied. The present improvement is directed in particular to the production of a type of attached-fin tube in which only very slight corrugations, or none at all, can be allowed in the inner radial margin of the fin material.

Various considerations, including the O.D. of the tube, the radial width and axial thickness of the fin, its material, and the like, determine the optimum procedure for applying the fin to the tube. Thus, a thin, smooth fin of ¼" radial height applied on a 1" diameter tube can be termed a low fin, and can in most cases be applied to the groved tube directly from a straight strip of the fin material under tension alone, without requiring any pre-shaping or preforming to enable it to better enter the groove. In that case the ratio of tube diameter to outside diameter of fin is 1:1½.

However, when the same fin is attached to a tube of ¼" diameter, it is a different matter. Now the ratio of tube diameter to outside fin diameter is 1:3, and the straight strip material may have to be thinned out considerably towards its outside edge by preshaping it into a tapered and round fin capable of best entering between groove defining helical ribs of the tube. In some instances it may also be desirable to provide a pre-corrugation of the outer edge of the fin, possibly as shown in my application, Serial No. 839,770 identified above.

In any event, the proper method of producing a certain size fin of a certain material and shape will be determined by the ratio of tube O.D. to outside fin diameter, taking also into consideration the hardness, ductility and thickness of the fin material.

A considerable number of the embodiments of the apparatus herein illustrated and described pertain primarily to equipment for preforming the fin material in the manner and for the purpose described, and the preformed material may be applied to a previously grooved tube, i.e., one provided with helical grooves as an operation distinct from the fin forming and attaching operation. These embodiments illustrate various alternatives of the construction of the special fin preforming roll, and anti-friction and thrust absorbing provisions for the special fin preforming components of the mechanism.

However, a further and important aspect of the invention resides in the combination with novel fin preforming and attaching means, of the above coacting roll and disc type, of further provisions for concurrently forming the fin receiving grooves in the tube as it is advanced past the fin forming and attaching provisions. Such alternatives also involve special and improved provisions for positively driving the fin forming disc which coacts with the preforming roll, whether or not the latter is also driven and, further, for driving that disc coordinately with the tube grooving means. Such means may be in the form of a set of grooving discs associated coaxially on each of three equally spaced arbors of the apparatus.

In accordance with the invention these sets are driven positively at equal speed, thus rotatively driving the tube in grooving it; and the invention also contemplates the driving of the fin forming disc referred to above at a greater rotative speed than that of the groove forming sets, for a reason which will appear.

Unles it is otherwise indicated, it is to be understood that the improved provisions for the preforming of fin material, the inserting of the same into tube grooves and the crimping of rib formations on either side of the grooves into clinching engagement with the applied fin, as shown in practically all embodiments, may be considered as combined or combinable with provisions for forming the grooves in the tube, in a comprehensive operation involving all of the necessary tube grooving and fin forming and applying manipulations.

It is one object of the present invention to provide an improved fin preforming and attaching method and apparatus, in accordance with which a roll and disc type fin preforming device of one sort or another is mounted directly and closely adjacent one of the usual three arbors upon which the attaching discs are borne. The fin-forming roll is mounted in this position to rotate about an axis disposed other than parallel to the arbor axis, for example at 90°, or possibly acute thereto. Such fin-forming roll may be either driven, as from the disc arbor itself or otherwise, or may idle.

A further object is to provide a roll and disc type fin preforming device combined with fin attaching discs on the three arbors of the apparatus, in which the axial distance between the preforming roll-disc set and the attaching discs is kept at a minimum, for a reason to appear.

Another object is to provide a mechanism combining tube grooving means with fin preforming means as described, in which the axial distance between the grooving means and the preforming means is also kept at a minimum.

Still further, the invention contemplates the use of adjustable spring pressure to determine and maintain uniform the axial force under which the fin material is engaged between the special forming roll and forming disc, in order to minimize or eliminate side effects possibly arising in the operation of the equipment.

Yet another aspect of this invention is the provision of means for adjustably mounting the fin preforming roll to enable the shifting of its axis from a 90° intersecting relation to that of the tube being finned, a desired number of degrees offset from the 90° relationship. Thus, an improved centering of the fin material with respect to the tube axis is possible.

A more specific object is to provide fin forming and attaching apparatus as described, in which side and back pressures set up on and/or by the forming roll are entirely taken up within the arbor and its bearing structure, with provisions preventing undue friction resistances and pressures from being set up.

A further limited object of the invention is to provide fin-forming and attaching apparatus of the character described, featuring a special fin forming roll or rotary member preferably mounted closely adjacent and within the attaching arbor structure as a whole, in which the rotary member may, in lieu of coacting with an arborborn rotary disc, as described above, coact with a fixed guiding and backing plate mounted adjacent the attaching discs, in accordance with certain of the embodiments shown here and in my copending application, Serial No. 839,770, identified above.

The invention also contemplates the provision of back-up rollers for the preforming and attaching discs, which rollers are journaled on axes radial to the axis of the fin preforming and attaching arbor. These back-up rollers act to equalize the way in which pressure between the attaching arbor, discs and thrust bearing means is absorbed around the periphery of the arbor.

As will appear from the foregoing, the invention also provides various novel and improved methods for the preshaping or forming of fin material to a tapered cross section and applying the same as shaped to a grooved tube, in many instances in combination with the step of forming the grooving in the tube as an incident to the forming and applying operations.

The foregoing as well as other objects will become more apparent as this description proceeds, especially when considered in connection with the accompanying drawing illustrating preferred embodiments of the invention, wherein:

FIG. 2 is a view in end elevation, partially broken away and in transverse vertical cross section along line 2—2 of FIG. 1;

FIG. 4 is a fragmentary view in longitudinal or axial section generally similar to FIG. 1, showing a modified adaptation of the invention which is intended to form and attach fin material of greater radial width or height than the embodiment of FIGS. 1, 2 and 3;

FIG. 5 is a fragmentary view in axial section showing details of a driven fin preforming roll construction alternative to that shown in FIG. 4;

FIG. 7 is a view in end elevation, partially broken away and in transverse vertical section along line 7—7 of FIG. 6;

FIG. 8A is a fragmentary view in section of a slightly modified adaptation of what is shown in FIG. 6;

FIG. 11 is a fragmentary bottom plan view of the structure of FIGS. 9 and 10;

FIG. 11A is a fragmentary view showing an alternative variant of the arrangements of FIGS. 9–11;

FIG. 12 is a fragmentary view in axial section through still another modified form, in which the fin preforming roll rotates on an axis at other than a right angle to that of the attaching disc arbor;

FIG. 13 is a fragmentary view of a modified fin guide arrangement, in which a tapered roller of small diameter, disposed on an axis at an acute angle to that of the tube axis and the arbor axes of the mechanism, is used in association with fixed fin guide and smoothing plate provisions of the type illustrated and described in my above identified application, Serial No. 839,770;

FIG. 14 is a fragmentary view in section axially of the tapered roller of FIG. 13, i.e., along line 14—14 of that figure;

FIG. 15 is a further fragmentary and schematic view of another modified embodiment, in which an elongated fin guide and smoothing roller or stem is employed, with bearing means on opposite sides of its zone of guiding and smoothing engagement with the fin;

FIG. 16 is a fragmentary view in axial section of a still further modified adaptation, in which the axis of another type of tapered fin forming roller is also at an acute angle to that of the attaching arbor, which it in this case intersects;

FIG. 17 is a fragmentary view in transverse vertical section on a line corresponding to line 17—17 of FIG. 16;

FIG. 22 is a view partially broken away and in vertical longitudinal section along line 22—22 of FIG. 21;

Figure 21:
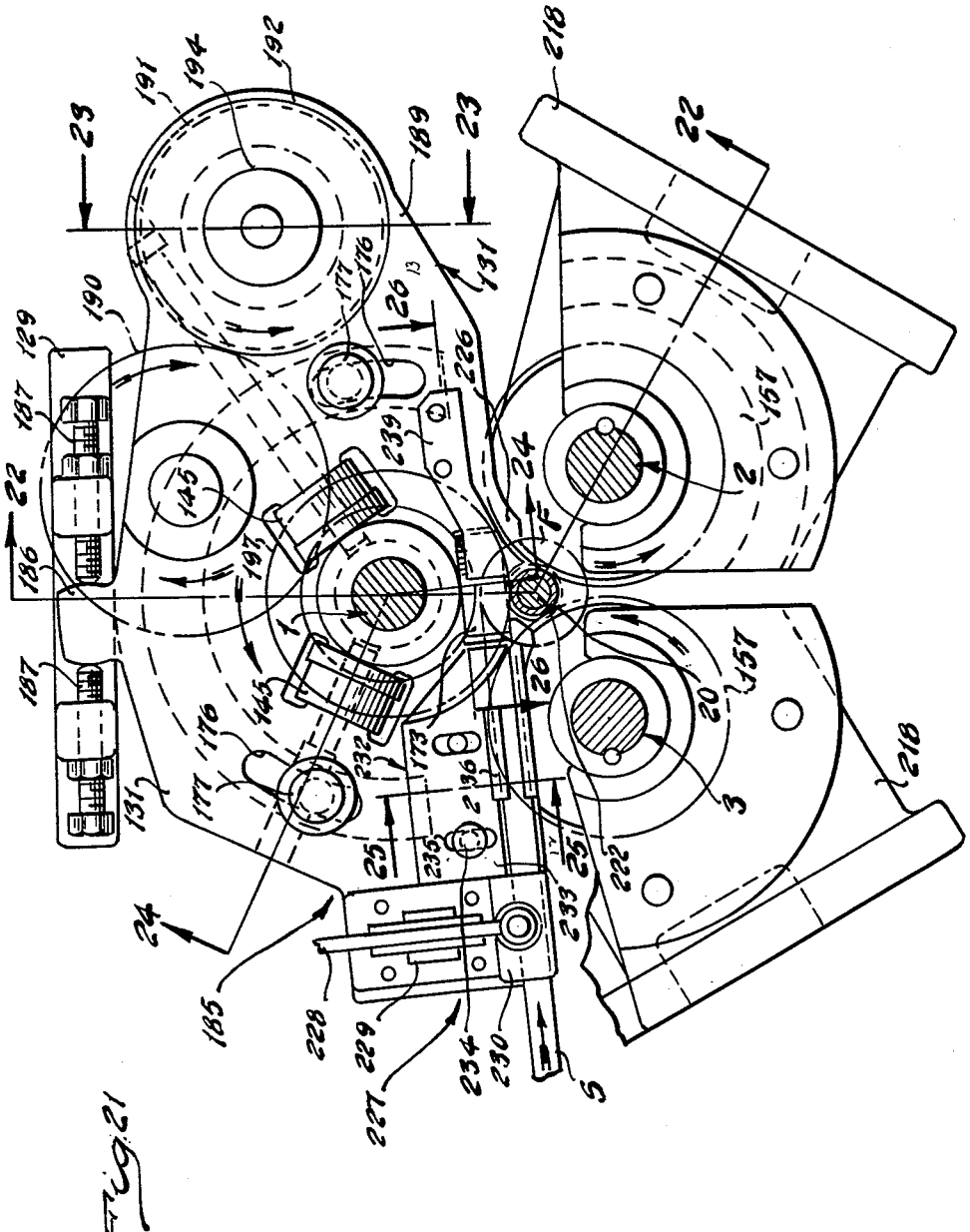
FIG. 21 is a view in transverse vertical section of another embodiment indicating further the provisions for offsetting the forming roll axis as desired, and also showing gear provisions for the drive of the fin forming disc in a positive way.

FIGS. 23 through 26 are, respectively, fragmentary views in section along lines 23—23, 24—24, 25—25 and 26—26 of FIG. 21;

FIG. 27 is a somewhat schematic end elevational view illustrating a proposed gear train for driving the fin forming disc positively, as from a tube grooving disc set, but at a higher rotative speed;

FIG. 28 is a fragmentary view of a mechanism incorporating the drive of FIG. 27, being in section along line 28—28 of FIG. 27;

FIG. 29 is a view sectioned along line 29—29 of FIG. 27, showing gears of the gear train not appearing in FIG. 28;

FIG. 30 is a view in axial section through another embodiment or modification featuring an outboard head for an attaching disc set, enabling its independent adjustment relative to the main fin forming and rolling means, also showing a separate tube grooving head driven coordinately with the forming and attaching arbors;

FIG. 31 is an end elevational view of another alternative, in a two-arbor type of mechanism for the finning of small diameter tube sections;

FIG. 32 is a view in vertical longitudinal section through the axes of the forming and attaching roll and disc means of the embodiment of FIG. 31, i.e., on line 32—32 of that figure.

FIG. 33 is a fragmentary view of a still further modified embodiment, in which the fin forming roll and the coacting forming disc are proportionally driven at variable speed, in the case of the roll by a shaft driven from an external source;

FIG. 34 is a fragmentary view in transverse vertical section on line 34—34 of FIG. 33;

FIG. 35 is a fragmentary view of still another modified embodiment in which the forming roll and forming disc are also proportionally driven at variable speed, but in a somewhat different manner, the forming roll being a special one of very large diameter;

FIG. 36 is a fragmentary view of a modified embodiment of a simplified nature, adapted to be employed when the fin material requires no special roll preforming; and FIGS. 37 and 38 are similar views, partially broken away and in axial section, of other embodiments for use under conditions in which the tension on the strip of fin material will suffice to guide the strip into proper position on the tube, FIG. 38 being an embodiment specially adapted for the production of plain end tubes or skipped fin tubes.

Figure 1:
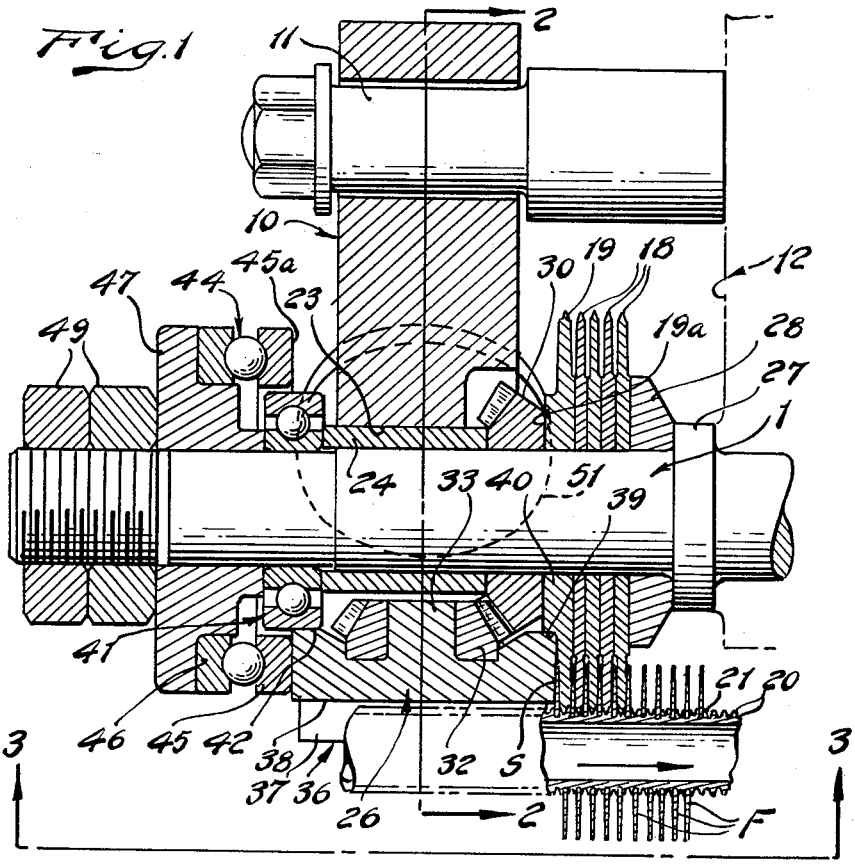
FIG. 1 is a fragmentary view in axial section through a set of attaching discs of a fin attaching machine, illustrating the mounting of one type of special, driven fin preforming roll and its coacting forming disc relative to the set, as well as to the advancing and rotating grooved tube, the view also showing improved bearing and thrust absorbing provisions.
Figure 3:
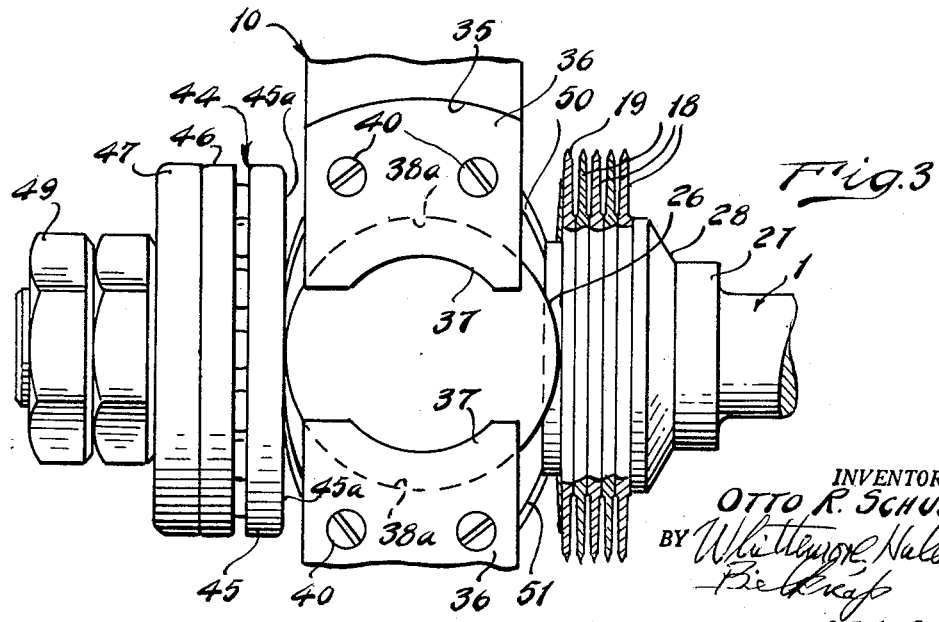
FIG. 3 is a fragmentary bottom plan view of the apparatus of FIGS. 1 and 2.

Reference may first be made to FIGS. 1, 2 and 3 of the drawings. They illustrate one of the several different embodiments of the principle of the invention in which povisions for grooving the tube, as an operation performed just before, position-wise, but simultaneously with the forming and attaching of the fin material to the tube grooves, are not shown as incorporated, as they are in later described forms. However, those skilled in the art will readily appreciate the feasibility of associating any known type of tube grooving head (some being hereinafter specifically referred to) to the fin forming and attaching mechanism for conjoint operation.

For consistency in the description to follow, in each instance in which the mechanism indicates or requires the use of grooving, fin forming and attaching tools mounted on three parallel arbors spaced 120° from one another, as is the common practice, those arbors will be designated 1, 2 and 3. Arbor 1 is the arbor with which the fin preforming roll contemplated by the invention is most directly associated.

The reference numeral 10 generally designates a heavy and rigid, fixed mounting bracket for the fin-forming roll and bearing structure of the invention. It is contemplated that the bracket 10 shall be fixedly mounted, as by a stud 11, to the arbor bearing structure of a suitable fin-attaching machine, typically shown in my copending application, Serial No. 839,770 identified above. Such structure is schematically shown in dot-dash line in FIG. 1 of the drawings and generally designated by the reference numeral 12.

This structure conventionally journals the three usual fin-attaching arbors 1, 2 and 3 of the machine, each of these arbors having coaxially mounted thereon a set of fin-attaching discs 18 and a fin-forming disc 19 of more rugged cross section on the inner side of the set of discs 18, for coaction with the fin-forming roll to be described. By these discs and roll a strip S of thin metallic fin material is preshaped and firmly attached to an axially advancing tube 20 having helical groove formations 21 thereon. These may be separately produced on the tube in the manner illustrated and described in my copending application, Serial No. 734,573 identified above, or otherwise; or in the alternative according to the present improvements, they may be formed on the tube as the latter is fed past the roll and discs, as shown in embodiments later to be described. The discs 18 on the respective arbors 1, 2 and 3 have the function of forcing the strip S, as preformed in its coiled outline by provisions to be described, into the axially spaced groove formations 21 of the tube, and clinching the material to the tube in the form of the helical fin F. It is the function of the various embodiments of the special supplemental fin-forming roll and bearing structure of the present invention to coact with the disc 19 in the preliminary coil-forming of the strip material S.

In view of the fact that it is contemplated that the basic fin-forming instrumentalities of the present invention are associated with but one of the attaching arbors, shown as the arbor 1, further detailed reference to the other arbors 2, 3 is in the main unnecessary; it will simply be understood that they also have attaching discs 18 mounted thereon in the manner shown in FIG. 1, these respective sets of discs coacting in the usual manner in conjunction with those on arbor 1 in the rolling and clinching of the fin material F in the tube grooves 21.

As applied to the arbor bearing structure 12 of the fin-attaching machine, the bracket 10 presents a central, laterally opening recess 23 (FIG. 2) receiving the arbor 1 axially, this opening mounting an annular sleeve bearing or bushing 24 fixed on the arbor. The recess 23 is less than 360° in extent, being exposed downwardly to a larger recess 25 formed at the bottom of bracket 10 and centrally thereof.

In the embodiment of FIGS. 1, 2 and 3, the special fin preforming roll is generally designated 26, and it is positively driven on an axis normal to that of the arbor 1. To this end the arbor 1 carries an enlarged radial flange or shoulder 27 to the right of the disc assembly (FIGS. 1 and 3), against which a disc back-up ring 28 abuts axially, serving as an axial support for the series of discs 18 and 19. On the opposite axial side of this set of discs a bevel gear 30 is fixedly applied to the arbor, as by a key 31 (FIG. 2), which key may also secure the bushing or bearing 24 to the arbor 1.

The forming roll 26 also has a bevel gear 32 suitably secured fixedly thereto and meshing with gear 30, the gear 32 being shown as suitably fixed to a radially inwardly projecting integral stem 33 on roll 26. Gear 32 and roll 26 are thus driven for rotation as a unit upon an axis which is in 90° intersecting relationship to the axis of the attaching disc arbor 1. The roll-gear unit 26, 32 is located closely adjacent the arbor 1, and (as shown in FIG. 2) partially within the recess 25 of the bracket 10.

Bracket 10 is provided, on diametrically opposite sides of the recess 25 and beneath the latter, with a pair of further countersunk recesses 35 which, as shown in FIGS. 2 and 3, are of substantial vertical depth. A gib insert 36 is provided to fit within each of the recesses 35, each insert presenting a radially inwardly projecting bottom gib seat 37 upon which the flat bottom circular surface 38 of the fin-forming roll 26 rests as an axial bearing. Arcuate side wall surfaces 38a are formed on the seats 37 to constitute radial bearings for the roll 26.

As thus supported for rotation about an axis radial to the arbor 1, being in close radial relation to the latter, the circular outer periphery of roll 26 will, on one exposed axial side of the bracket recesses 35 and gibs 36, roll the adjacent strip fin material S against the adjacent forming disc 19 to its right, as viewed in FIGS. 1 and 3, thus preforming the strip S toward its desired coiled shape and, under a sufficient axial pressure, tending to thin the material to a tapered outline. In order to stabilize the roll 26 radially of arbor 1, the forming disc 19 is axially inwardly shouldered at 39 about a hub portion 40 thereof, thus to receive for rotation therebeneath the outer peripheral forming surface of roll 26.

As driven by frictional engagement between the disc 19 and the periphery of forming roll 26, itself positively driven, the fin material S is drawn from a flat strip length S into the coiled outline appearing in FIG. 2, being then progressively forced radially inwardly against the tube 20 as the latter advances axially in the direction of the arrow of FIG. 1, and being clinched at its inner diameter between the ribs of the tube defining the grooves 21.

It is seen that in this type of action, appropriate provision should be made to sustain strong axial forces exerted on and by the special forming roll 26 in both the radial and axial directions, and the invention contemplates improved means for this purpose. In the first place, as shown in FIGS. 2 and 3, the gib members 36 are strongly secured upwardly in the bottom and side recesses 35 of bracket 10, as by suitable bolts or studs 40 taking upwardly into the bracket. An appropriately large capacity radial thrust ball bearing 41 encircles the arbor 1 to the left (FIG. 1) of bushing 24, the latter bearing axially against the inner race of bearing 41. The outer race of the bearing 41 serves as an antifriction rotary support against which the adjacent top outer peripheral surface 42 of the roll 26 rolls, thus providing a very desirable anti-friction and radial thrust arrangement resisting radially inward tilt of the left-hand side of the rotating roll 26. The relatively thin fin-forming disc is, of course, correspondingly braced to resist bending in the axial direction.

An axial thrust ball bearing 44 similarly serves to sustain thrust axially of arbor 1, and to further assist in containing radial tilt tending to be exerted upon the forming roll 26 as it rolls the material of the fin. Thus, bearing 44, has an axially inner race 45 against which the forming periphery of roll 26 engages and by which it is axially sustained. The axially outer race 46 of bearing 44 outwardly abuts an end plate 47 fixed on arbor 1. Thus the radial bearing 41 primarily takes upward tilting thrust of the forming roll 26 at its left-hand side, while sustaining sleeve bearing 24 and arbor 14 axially; and the axial thrust roller bearing 44 takes back pressure from the rotating forming roll 26, while in a measure also resisting tilt.

Two large lock nuts 49 are threaded on the end of arbor 1 outwardly of backing plate 47. These sustain the overall axial thrust, and may also be employed for adjusting the rolling pressure of forming roll 26 against the fin material 19, or to set the tools in accordance with the thickness of the fin material employed.

Further thrust receiving and distributing means are provided in the embodiment of FIGS. 1, 2 and 3 (and may also be present in other embodiments to be described), in the form of a pair of inclined disc-backing rollers 50, 51, shown best in FIG. 2. These are received in suitable openings 52 in bracket 10, on either side of the vertical center of the latter, being in approximately equally spaced relationship to one another and to the forming roll 26 in the circumferential sense. The backing rollers 50, 51 are mounted for free rotation on spindles 53 carried by bracket 10 and disposed radially of the axis of the arbor 1.

As indicated best in FIGS. 1 and 3, the rollers 50, 51 roll on one side thereof (left-hand side as viewed in FIGS. 1 and 3) against the flat, axially facing surface 45a of the inner race 45 of axial thrust bearing 44, and at the opposite side thereof, rollers 50, 51 bear against a corresponding axially inwardly facing surface 19a of the forming disc 19. Rollers 50, 51 equalize the distribution of pressure, in the circumferential sense, between the forming roll 26 and the radial and axial thrust provisions therefor, thus contributing to a uniform forming force exerted on the fin material between roll 26 and disc 19. The latter is also braced in the axial direction, as in other embodiments of the invention incorporating the radial and axial bearing means and backing roller provisions referred to. Those skilled in the art will appreciate the fact that other types of equalizing and back-up rollers may be employed, for example, incorporating suitable ball or roller bearing features to further reduce friction.

In use, the diameter of the driving gears 30, 32 for fin-forming roll 26 may be varied as desired, preferably always in a desired relation to the diameter and rotative speed of the forming disc 19 and attaching discs 18, as determined by the thickness and radial width of the fin strip S, and by other factors.

If desired, and as illustrated in FIG. 2, the bracket 10 may serve as a support for a suitable guide 55 for the straight fin strip S, as it is led into the space between forming roll 26 and disc 19 in the forward rotative advance of the tube 20.

FIGS. 4 and 5 illustrate an alternative adaptation of structural features shown in FIGS. 1, 2 and 3 in an installation of stronger structural character, employing somewhat larger forming and attaching discs and larger forming roll, thus to handle fin material of greater radial width and/or axial thickness. However, its component parts are, in the main, similar to those shown in FIGS. 1, 2 and 3, so that to the extent of the similarity corresponding parts and relationships are designated by corresponding reference numerals, primed, and further description will be dispensed with.

In this embodiment, the larger diameter fin preforming roll 26′ is sustained from beneath by an axial thrust ball bearing 57, the upper or inner horizontal race 58 of which is snugly received within a circular bottom recess in roller 26′, so as to rotate with the latter about an axis normal to and intersecting that of the disc arbor 1. The outer or lower race 59 is fixedly mounted on and sustained by the side gibs 36′ of bracket 10′. These additional anti-friction provisions enable heavier axial radial and tilting thrusts to be better sustained. Back-up rollers similar to the rollers 50, 51 of the first form may also be employed in a similar relation to disc 19′ and bearing race 45′.

In a still further modified embodiment shown in FIG. 5, an upper horizontal surface of a bottom recess 60 in the fin-forming roll, also designated 26′, is formed to provide an annular raceway 61 for a ball bearing 62, eliminating the need for the inner or upper race 58 of the embodiment of FIG. 4. The bearing 62 takes downward thrust on the forming roll 26′ incident to its operation, and the gib members 36′ hold such thrust bearing provision in position. In other respects, structural features of FIGS. 4 and 5 are as described in connection with FIGS. 1, 2 and 3, including equalizing and back-up rollers corresponding to the rollers 50, 51 of that embodiment; the further anti-tilt radial and axial thrust bearing arrangements at 41′ and 44′ are upon inspection the same in substance.

However, further modifications are contemplated, illustration of each instance of which would unduly complicate this disclosure. For example, the forming roll 26 or 26′ may be otherwise driven positively than by bevel gearing, as by a suitable train of spur gearing from an external source (shown in a later described form). Likewise, in the above-described embodiments, the forming roll may be allowed to idle in operations not involving particularly heavy pressures, heavy forming forces, etc.

Figure 6:
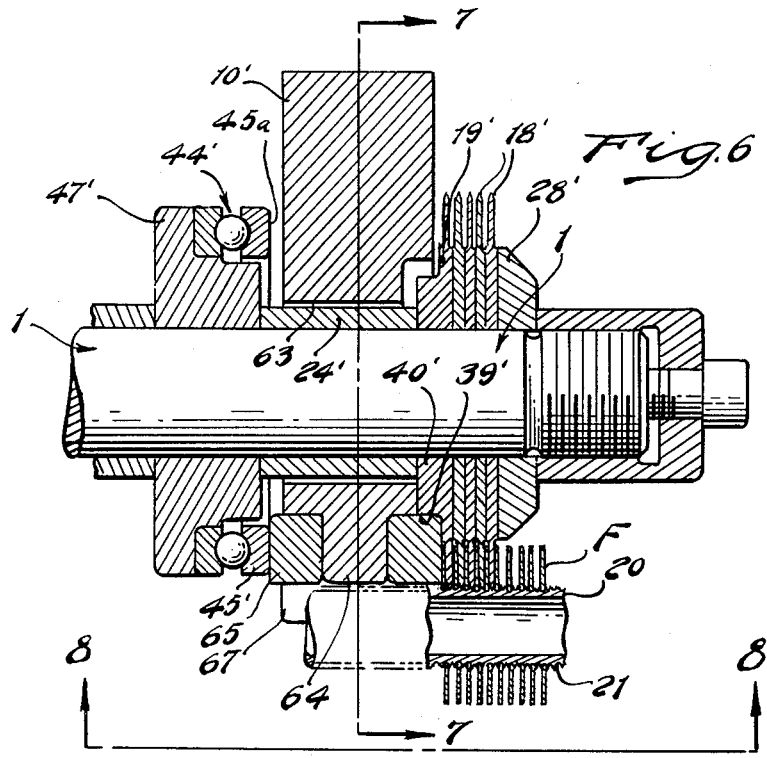
FIG. 6 is a fragmentary view, in section similar to FIGS. 1, 4 and 5, of another alternative embodiment of fin-forming and attaching mechanism, in which the supplemental forming roll idles, being driven only by the fin material as held thereagainst by the coacting forming disc.
Figure 8:
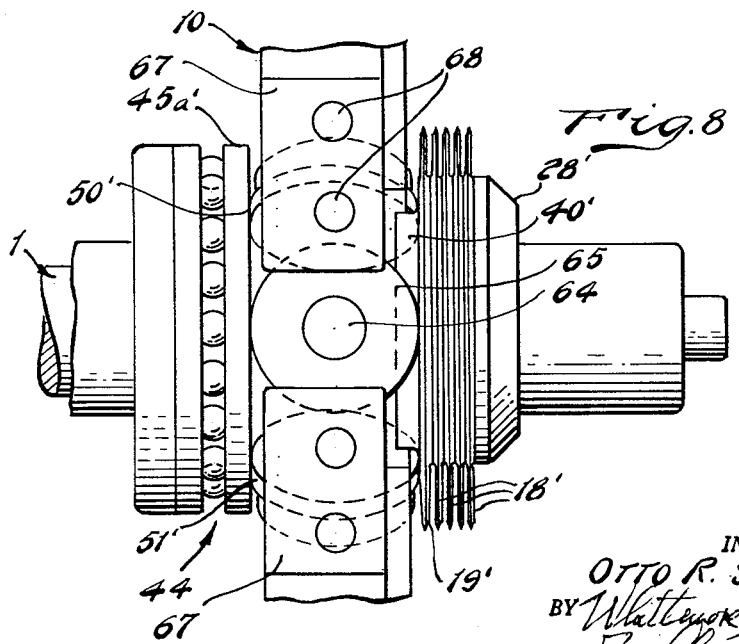
FIG. 8 is a fragmentary bottom plan view of the form of FIGS. 6 and 7.

FIGS. 6, 7 and 8 show such an alternative installation lacking a positive drive for the forming roll. Here again, parts and relationships corresponding to what is shown in FIGS. 1, 2 and 3 will again be designated by corresponding reference numerals, primed, and further description dispensed with.

In the embodiment of FIGS. 6–8, the bracket 10′ is formed to provide a central axial opening 63 therethrough and, beneath this opening, a central and vertically downwardly depending post 64 integral with the bracket. This post is cylindrical in horizontal cross section and has the fin preforming roll 65 journaled thereon on an axis at 90° to the axis of the arbor 1, again within the radial and axial zone of the other bearing provisions. As indicated above, the forming roll 65 is rotated solely by friction in rolling the fin strip S. In order to further decrease resistance to rotation a ball bearing type of roller may be substituted for the solid-sectional roll 65 shown. No radial bearing corresponding to the bearing 41 of FIGS. 1–3 is shown, but such may, of course, be provided, if desired. As in the other forms described above, side gib members axially sustain the forming roll 65 from beneath, in this instance the gib members being constituted by separate plates 67 secured upwardly to bracket 10′ by bolts 68.

FIG. 8A illustrates a slight modification of the structure of FIGS. 6, 7 and 8, in which the bracket 10′ has a fin-forming roll 70 journaled thereon in the general manner of those figures, but in which this forming roll is sustained from beneath through the agency of an upright bearing stud 71. The stem of this stud is threadedly received in a bore 72 in a depending bracket post 73 on which the roll is journaled. Stud 71 has a radially enlarged lower head 74 which is received within a counterbore of the forming roll 70, thus affording bottom axial bearing support for the latter in its rotation. In other respects, the adaptations of FIGS. 6, 7 and 8 and FIG. 8A are as described previously in connection with former embodiments, save for the elimination of the positive drive of the forming roll. This feature may be added, if desired.

Figure 9:
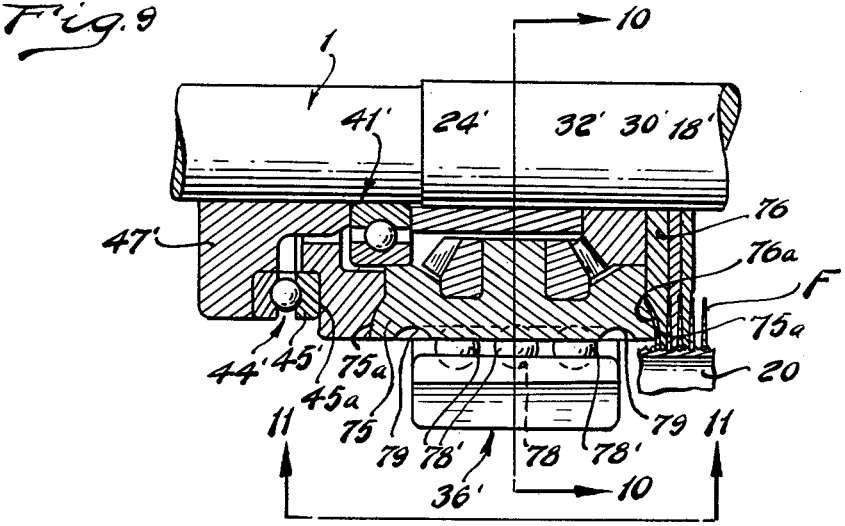
FIG. 9 is a fragmentary view in section through the axis of an attaching disc arbor, illustrating a still further modified, driven forming roll embodiment of the invention.
Figure 10:
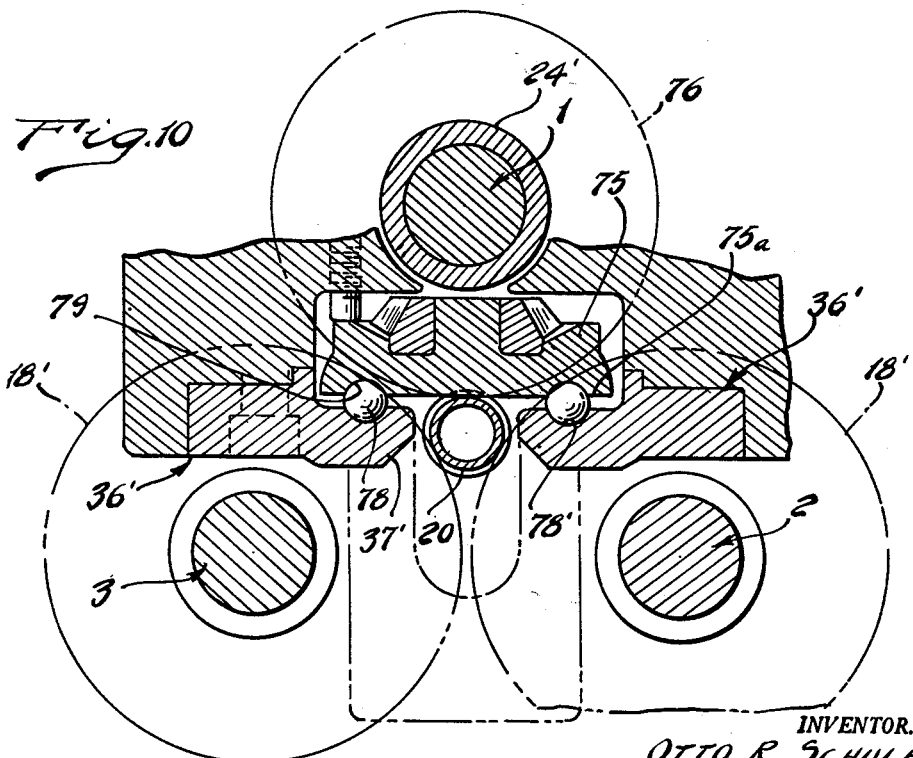
FIG. 10 is a fragmentary view in transverse vertical section on line 10—10 of FIG. 9.

The embodiment of FIGS. 9, 10 and 11, parts common to other forms being again primed, is one in which the forming roll, specifically designated 75, is positively driven by a bevel gear arrangement similar to that of the first two forms. However, its outer side surface is specially contoured at 75a in a laterally projecting, mildly convex arcuate outline, and the adjacent coacting fin-forming disc, designated 76, has an approximately mating, mildly concave surface at 76a. The result is that the fin strip S is initially curved and thinned out by the roll 75 and disc 76 of the arbor 1.

In explanation, in the forming of finning of relatively small radial width and hard material, or of softer material in a greater radial width, the pressure applied against the usually fairly thin forming disc, corresponding to the discs 19, 19', may bend or break the same. Therefore, in order to overcome this, in the embodiment of FIGS. 9–11, the strength of the forming disc 76 is increased by increasing its axial thickness radially inwardly of its arcuate formation 76a. The fin material, as curved by this formation, is subsequently straightened by the set of following attaching discs 18' on arbor 1 and the coacting discs of the other arbors 2 and 3.

In the embodiment of FIGS. 9, 10 and 11, the forming roll 75 is, as before, axially sustained by seat extensions 37' of the gib members 36', but the extensions are in this instance formed on the upper surfaces thereof to provide individual seats 78 for bearing balls 78', in a series of three on each of the opposite sides of the arbor axis, as best shown in FIG. 11. The forming roll 75 is in this case provided with an annular raceway 79 in which the balls 78 run, thus providing an anti-friction support for the roll. In other respects, its radial and axial thrust absorbing provisions are as described in connection with the preceding embodiments.

FIG. 11A illustrates an optional modification of the features of FIGS. 9, 10 and 11 in that, in order to provide for an increasing of the strength of the forming disc, designated 76', adjacent the forming roll, here shown as a cylindrical one designated 81, a mild concavity is formed at 82, about the axially outer side periphery of said disc 76', i.e., on the opposite side from the formation 76a of FIGS. 9–11. This signifies that the fin material S is initially bent in the opposite direction than in FIG. 9; however, it is then straightened out radially by the attaching discs 18' of the arbors 1, 2 and 3. A spacer disc 83 is interposed between forming disc 76' and the adjacent attaching disc 18'.

It is to be understood that other types of bearing element, for example, tapered rollers, may be substituted for the bearing balls 78 in the two embodiments just described.

FIG. 12 of the drawings show a still further modified embodiment of the invention, differing essentially from all those considered above in that, rather than rotating on an axis in 90° intersecting relation to the axis of the arbor 1 with which the special fin-forming roll is associated, the axis of rotation is at an acute angle to the arbor axis. The embodiment of FIG. 12 also differs in a sense from those earlier described, in that it omits a fixed mounting brackets for the forming roll, since the latter mounts about the arbor itself.

The forming member in this modification is in the form of an annular sleeve or ring 84 which has an annular side forming surface 85 of mildly frusto-conical outline. The axis of forming ring 84 is, as indicated above, at an acute angle to the axis of the arbor 1, and to this end the ring 84 is coaxially mounted upon a rotary support 86 which presents a cylindrical ring supporting and bearing surface 87, whose axis is at the indicated inclination to the arbor 1. Support 86 is telescoped on arbor 1, and an axial thrust bearing 88 surrounds the surface 87 to receive thrust from the radial rear surface 89 of forming ring 84. The inner or rear race 90 of this bearing rearwardly abuts against an annular seat 91 formed on the support 86.

Support 86 is mounted coaxially of the arbor 1 at an inner bore 92 thereof. A bushing or sleeve bearing 93 is employed for the purpose of rotatively mounting the arbor 1 within this bore; and a plurality of tapered anti-friction rollers 94 or, in the alternative, appropriate ball bearing means, are provided in rolling engagement with the forward forming surface 85 of ring 84, to take side pressure on the latter in a balanced manner. Their function is similar to that of the back-up rollers 50, 51 or 50', 51' of other embodiments.

The ring support 86 is stationary and, if desired, may be part of a fixed bracket (not shown) corresponding to the bracket 10 or 10'. An appropriate axial thrust bearing 96 is applied between the support 86 and a suitably sustained disc 97 fixed to the arbor 1 for rotation therewith.

The forming member may, as previously, be positively driven, the ring 84 of the embodiment of FIG. 12 being optionally provided with an external drive gear formation 98 adapted to be gear-engaged from the exterior for driving. However, rotation of the fin supplemental forming ring may be solely under frictional engagement with the fin material.

FIG. 13 and 14 illustrated an alternative embodiment as disclosed in my copending application, Serial No. 839,770 identified above, in which a tapered rotary fin-forming and smoothing member 100 acts in conjunction with a fixed fin guide forming and smoothing guide plate 101. An operation of smoothing external peripheral corrugations of a fin coil is performed by member 100 and plate 101 (as described in my application), coordinately with the peripheral shaping of the fin material to conform with the tube's grooving.

Member 100 is in the form of a tapered roller of small diameter offset laterally from and extending at an acute angl to the axis of the tube into close side adjacency to the fixed plate 101. The nose of the tapered roller is located in a position to just clear the ribs defining the grooving 21 of tube 20.

Plate 101 is appropriately bolted or otherwise secured to a rigidly mounted suspending bracket 102 at one side of a mandrel 103 over which tube 20 passes longitudinally, and a guide sleeve (not shown) for the pre-coiled fin, as described in my copending application, Serial No. 839,770.

The plate is milled at a side thereof to provide a recess 104 receiving the fin width, and is further formed on its edge facing the axis of tube 20 to provide an arcuate seat 105 concentric with the tube axis. This is of sufficient radius of curvature to outwardly clear the groove ribs of the tube as the latter travels axially past the plate.

The roller 100 rotates along the incoming side of the fin, smoothing its corrugations in coaction with the plate 101 and simultaneously forming the same in the radial sense. As shown in FIG. 14, the shaft 106 of the roller 100 is mounted by a ball bearing 107 in a suitable fixed housing 108, with a seal 109 in engagement with the stem to preclude the entry of foreign matter. Tapered roller 100 may function as an idler, or may be rotated at a relatively fast speed by suitable means (not shown).

As also indicated in FIG. 14, it may be desirable to back up the roller 100, and thus maintain the desired rolling pressure on the fin corrugations, as by means of a suitable fixed journaled backing or bearing roller 110 shown in dotted line in FIG. 14. It may also be desired to relieve the tapered roller 100 circumferentially, as by an annular undercut 111 on the roller behind its inner tapered rolling tip, as also indicated in dotted line in FIG. 14; and if the backing roller 110 is employed it will roll along the surface of such undercut.

FIG. 15 discloses a further arrangement in which a guiding and smoothing roller performing the function of tapered roller 100 is elongated in character, as the elongated stem 112 mounted by bearings (not shown) for rotation in longitudinally fixed and aligned housings 113 at opposite sides of the fin smoothing area. A tapered portion 114 is provided on the smoothing roller at the rolling zone.

FIG. 16 and 17, to a further embodiment similar to that of FIGS. 13–15, illustrate a general functional equivalency of tapered special fin-forming roller and backing plate provisions to the forming roll and disc arrangements shown in the preceding embodiments. In FIGS. 16 and 17 the tube 20 is shown as being axially advanced through an elongated coaxial fin guide sleeve 115, of the type employed in FIGS. 13–15, about which the fin material, here also shown as being in pre-coiled condition and generally designated 116, is disposed. The fin coil 116 may, if conditions indicate, be precorrugated about its outer peripheral sides, as in the embodiment of FIGS. 13–15. Attaching discs 18' are suitably journaled for rotation on the arbor 1, and the inner end of the sleeve terminates adjacent a fixed fin-guiding and backing-up plate, generally designated 117, between which and the adjacent forming disc 19' the fin material 116 is introduced. The sleeve 115 is cut back at 119 to receive a tapered or frustoconical fin-forming roller 120, which extends closely adjacent the tube 20. This roller is positively driven, as by a suitable motor drive source 121, on an axis at an angle other than 90° to the axes of tube 20 and arbor 1, but in intersecting relation thereto, as distinguished from the offset relation of FIGS. 13–15.

A second fixed fin-guiding and rolling plate 123 is mounted closely adjacent, and on the opposite side of tapered roller 120 from the plate 117, to receive the fin material 116 between the roller and plate 123, an arcuate contouring of the plate at 124 being provided to permit a substantial thickening of the body of the plate 123 radially outwardly of the fin rolling and attaching zone. The resultant initial curving of the fin material is corrected substantially as it passes further attaching discs 18', as in the embodiment of FIGS. 9–11 and 11A. The forming roller 120 is preferably backed radially by one or two back-up rollers 125.

It is seen further that the invention, in its broadest aspect and as thus far described, affords various embodiments in which a strip of fin stock, straight or preformed into coil outline, is further formed, brought directly into engagement with the tube and attached to the latter in the grooves thereof by special supplemental rotary roll or equivalent means, usually coacting with the attaching discs 18 or 18'. In all instances such rotary means is mounted closely adjacent the arbor of one of the sets of attaching discs, and is supplied with ample and improved means to sustain in this close-in zone the various radial and axial thrusts accompanying the formation and attachment of the fin.

The foregoing description pertains primarily to a variety of different types of fin-forming roll or roller designs coacting with arbor disc or fixed provisions in the forming and rolling of thin fin strip material to a grooved tube. As indicated above, the further embodiments to be described deal with the incorporation of such fin forming and attaching means with provisions for rolling the fin-receiving grooving in the tube, and for coordinately driving these agencies in a desired rotative speed relationship to one another. Also to be dealt with are certain refinements relating to the balanced application of axial force to the fin material in forming the same to the tube, to a desired adjustability by the fin forming roller, and the like.

Figure 18:
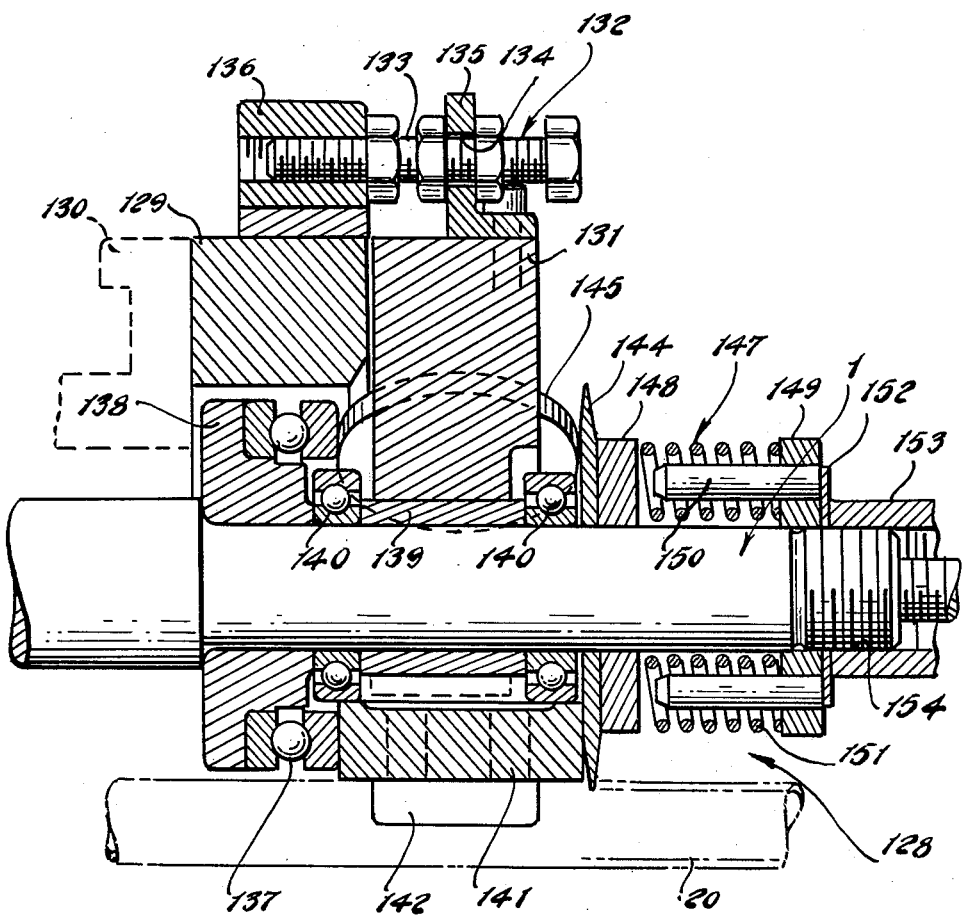
FIG. 18 is a view in axial section through the fin forming roll and disc means of yet another modified embodiment, in which adjustable spring means are employed to regulate and maintain uniform the axial force exerted on the fin material, this view also indicating in a most general way certain provisions for offsetting the 90° axis of the fin forming roll relative to a plane through the tube axis.

A simplified embodiment of forming roll and disc unit, incorporating means for the adjustable application of balanced axial force to the fin material, is illustrated in FIG. 18 of the drawings, being generally designated 128. This unit includes an appropriate rugged spacer block 129 suitably secured in fixed relation to the front bearing structure 130 of a tube finning machine. A mounting bracket 131 is adjustably secured to the spacer block 129, for adjustment of the bracket about the axis of the arbor 1, for a purpose to be described further in connection with FIGS. 19 and 20, and other figures of the drawings. Such adjusting means is generally designated in FIG. 18 by the reference numeral 132, and includes a stud 133 extending through an arcuate slot 134 in an angle member 135 on the top of bracket 131, the stud being threadedly received in a lug 136 secured on the top of spacer block 129.

Bearing provisions for the arbor 1 in the bracket 131 are generally similar to those previously described, hence will be only mentioned in a general way. They include an axial thrust ball bearing 137 on a collar 138 which backs against a shoulder on the arbor 1, a bushing 139, and radial thrust bearings 140 at either axial side of the latter, against which the forming roll 141 bears axially, i.e., on an axis radial to that of arbor 1. Gib provisions 142 similar to those previously described furnish axial support and further rotative bearing action for the roll 141; and it will be appreciated that in respect to these various forming roll and bearing provisions it is contemplated that they may be replaced by others such as have been described in connection with the previous figures.

A fin forming disc 144 is mounted on arbor 1 for coaction with the forming roll 141, the disc in this instance idling on the arbor and being backed up by backing rollers 145, which act in the manner of the previously described back-up rollers 50, 51.

An adjustable spring type pressure applying unit 147 is mounted upon the arbor 1 on the side of the foregoing disc 144 opposite forming roll 141. This unit comprises an abutment washer or collar 148 sleeved on arbor 1 and inwardly abutting the disc 144; a further pilot collar 149 also sleeved on the arbor to the right of washer or collar 148, the collar 149 carrying a plurality of axially extending pilot pins 150 extending parallel to the arbor axis toward washer 148, upon which heavy duty coil compression springs 151 are piloted. Collar 149 is sustained axially outwardly by an abutment ring 152 fixed to a tubular adjusting cap 153 which is threadedly engaged at 154 with the outer end of arbor 1.

Thus, acting in compression between the axially fixed but adjustable collar 149 and the washer 148, the springs 151 force disc 144 against the fin material in forming the same in the manner contemplated by the invention. The degree of force is adjusted by threadedly manipulating the tubular adjusting cap 153. The desirability or need for these adjustable spring provisions (and various other types of spring means, such as Belleville washer or single coil spring, may be substituted for the plural springs 151) arises from the conditions encountered in the operation of the fin forming unit 128.

Thus, arbor 1 of the fin forming unit is constantly under high tension between its shoulder against which the member 138 abuts and the cap 153, and any variation in the distance between these two points during operation tends to affect the shape of the fins, as formed by the roll 141 and disc 144. Such variation might arise due to the effect of heat or uneven pressures, to a forming disc of variable thickness, or a weak one, or a weak arbor. These sources of trouble must be eliminated to the extent possible, and the type of correction of the factors just mentioned is obvious, i.e., the correction of the objectionable weakness, or the like.

The presence of the adjustably resilient force supplying unit 147 further minimizes the side effects referred to by insuring that the fin forming pressure is not applied rigidly, but rather in a way to enable it to be self-adjusting, and to be applied in an even and balanced fashion. This will accommodate arbor expansion, fin width variation, and even some slight dishing of the forming disc 144. If the disc has a slightly variable thickness or shape, it will nevertheless be pressed against the fin strip with the same pressure, and the spring means insures a constant rolling action at the rolling zone of forming roll 141.

As indicated above, the disc 144 is not keyed rigidly to the arbor 1, although of course rotating in performing its forming action.

Figure 19:
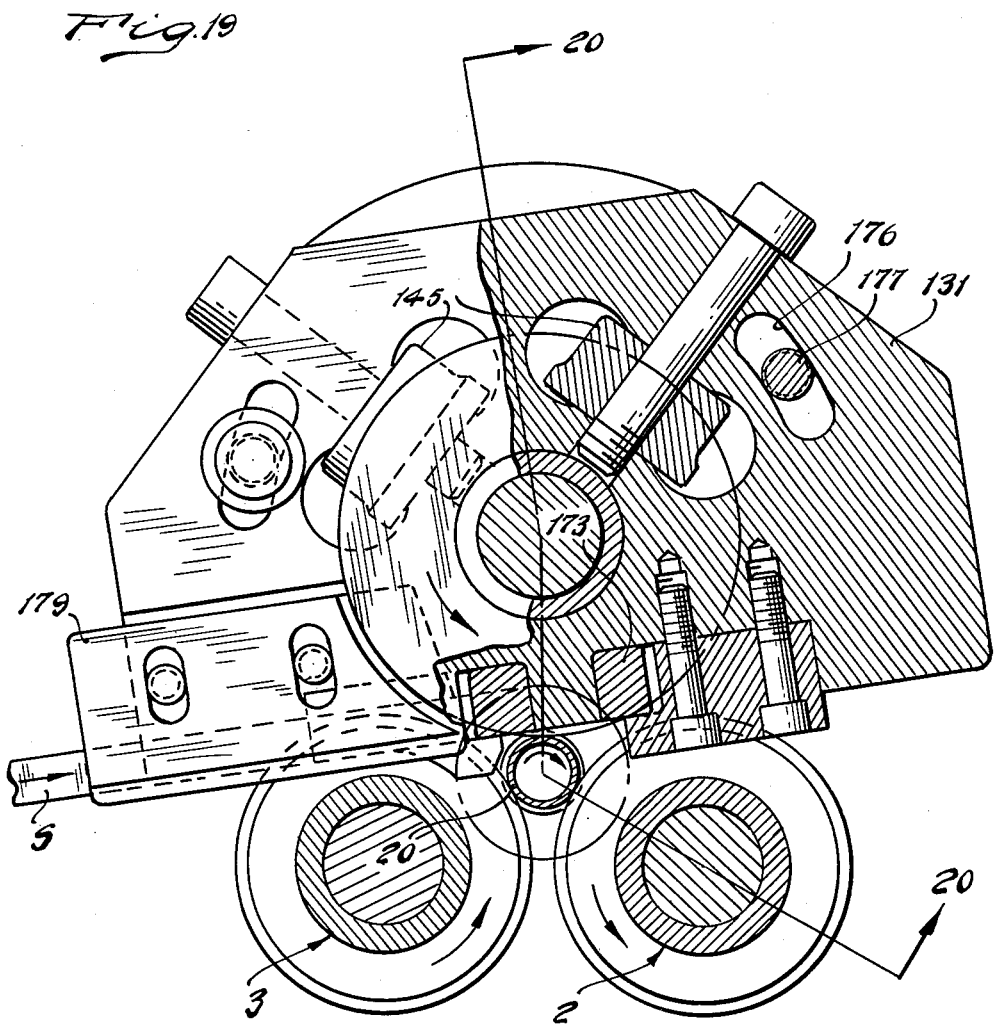
FIG. 19 is a fragmentary end view, partially broken away and in transverse vertical section through a mechanism according to still another alternative form, in which the tube is simultaneously grooved as an incident to the fin preforming and application thereto, the view also showing the offsetting of the forming roll axis as referred to above.
Figure 20:
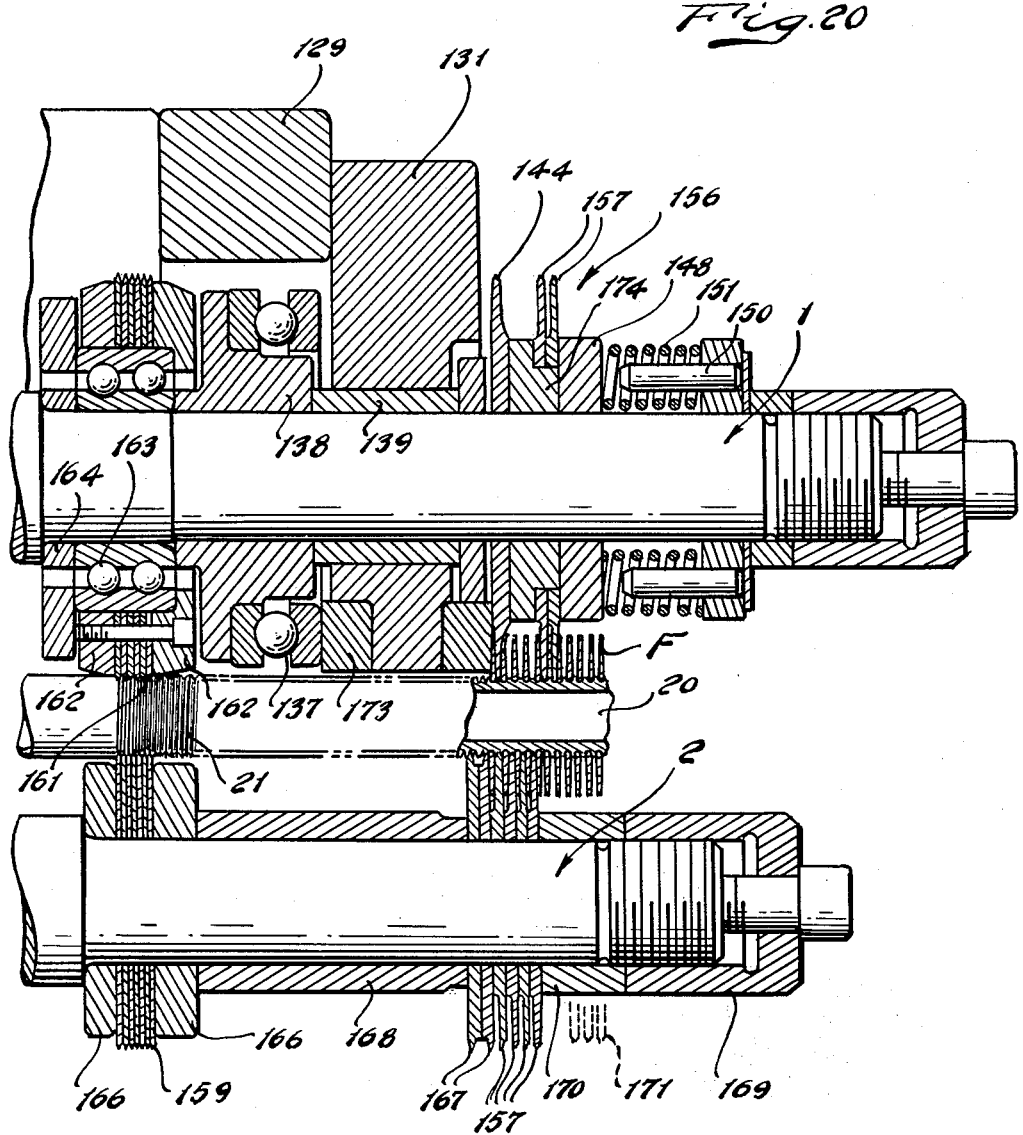
FIG. 20 is a fragmentary view in vertical longitudinal section along line 20—20 of FIG. 19.

FIGS. 19 and 20 illustrate a further refinement of the embodiment of FIG. 18 in two significant respects. That is, the fin preforming unit, here designated 156 (in this case shown as incorporating a pair of idling attaching discs 157 located closely adjacent and outwardly of the forming disc), has (*a*) means for adjusting the mounting bracket 131 about the axis of arbor 1 and (*b*) is associated unitarily with provisions for forming the grooving 21 in the tube 20 as a combined incident to the forming and attachment of the fin material F. To this end, a set of grooving discs 159 is fixedly secured on each of the arbors 2 and 3, and the arbor 1 carries, rearwardly of the disc member 138 which sustains the axial thrust bearing 137, a set of idler discs 161 which follow in the grooving 21 produced by the discs 159, the discs 161 backing up the tube 20 and coacting with the sets 159 in grooving the tube. As will appear, however, it is desirable to positively drive all three sets of tube grooving rollers. However, the use of one set of idling back-up discs is shown as a possible variant usable under certain conditions.

As for structural details, the idler grooving discs 161 may be clamped up between annular members 162 fixedly mounted to the outer race of the radial thrust bearing 163, as shown in FIG. 20, this bearing backing against a collar 164 axially sustained by arbor 1. The bearing disc member 138 rearwardly abuts the inner race of bearing 163.

As for the grooving discs on arbors 2 and 3, they are respectively in fixed relation to the latter, being assembled between similarly fixed collars 166 on arbors 2, 3. In addition to attaching discs 157 on arbors 2 and 3, similar to those on arbor 1, the arbors 2 and 3 may carry one or more groove sizing discs 167, which travel the helical grooving of the tube, as shown in FIG. 20. Should there be a variation in width of the multiple grooves 21, the disc or discs corrects this and makes the insertion of the fin material in the grooves more sure and positive.

Spacer sleeves 168 on arbors 2 and 3 separate the tube grooving assembly from the sizing and attaching disc assembly; and an adjustable cap 169 threaded on arbor 2 and an interposed optional spacing sleeve 170 are employed to clamp up the two assemblies on the respective arbors 2 and 3. If desired, the sleeve 170 may be omitted or replaced to provide for the reception on those arbors of a set of fin straightening discs 171, shown in dotted line in FIG. 20. These discs correct and straighten any tilt in the fin material after passing the forming disc 144 on arbor 1, due to the heavier cross section of that disc, although such tilt may be desirable in some applications. It is desirable to maintain these two assemblies as close together in the axial sense as possible, just as it is desirable to maintain as close as possible a spacing of the forming disc 144 from the attaching disc 157 on arbor 1, and as close as possible a spacing of these last named discs in the axial direction from the two grooving sets.

In other significant respects, the embodiment of FIGS. 19 and 20 resembles that of FIG. 18, hence corresponding reference numerals are applied. It may be noted that mounting and bearing provisions for the forming roll, here designated 173, differs somewhat, but not essentially in so far as the basic design of the two embodiments is concerned. Forming disc 144 may be an idler, although, for reasons hereinafter appearing, it is preferable that it be positively rotated with the arbor 1. The attaching discs 157 idle on a shouldered mounting disc 174, against which the washer or collar 148 rearwardly abuts.

Referring to FIG. 19, it is seen that the bracket 131, upon which the fin-forming roll 173 is journaled, is provided with a pair of opposed arcuate slots 176, these receiving studs 177 by which the bracket is secured to the spacer block 129. The slots 176 permit a limited angular adjustment to the bracket and all parts carried thereby about the axis of arbor 1, i.e., from a position in which the axis of forming roll 173, normally in 90° intersecting relation to the axis of the tube 20, can be shifted or offset slightly, to the acutely angled relationship shown in FIG. 19. It has been found that, with the forming roll set up directly on a line through the axes of arbor 1 and the tube, the fin material is not formed accurately about the tube on the axis of the latter, especially at commencement of the forming and attaching operation; but is somewhat offset, hence cannot be wrapped about the tube on a true center. Thus the offsetting adjustment shown in FIG. 19 is provided, permitting the entire forming roll unit to be shifted angularly relative to arbor 1, thereby offsetting the axis of roll 173 to any required or desired position.

FIG. 19 illustrates an adjustable strip guide device, designated 179, by which the flat strip material S is properly led to and between forming roll 173 and disc 144. A refinement in this type of strip guide is illustrated and described in connection with a later embodiment.

Mention has been made that it is desirable that the tube grooving discs 159, 161 be set up as closely as possible, axially, to the fin forming disc 144, and that the latter be kept just as close as possible to the attaching discs 157, particularly when tube forming and fin forming discs are driven positively. Due to industrial allowable tolerances in a given basic tube 20, as to diameter, wall thickness, wall concentricity, hardness, straightness, and the like, practically every tube will stretch differently during the grooving and fin attaching operations, under tension necessarily borne thereby. Due to the use of a number of tube grooving discs 159, 161 in each groove set, the spacing of grooves on each separate tube is fairly constant; however, enough variation in spacing may still exist that the tube grooves may not match the fin forming disc 144 upon reaching the latter from the grooving discs. Hence, the desirability of placing these two operations just as close together axially as possible, to minimize the axial variation. Of course, if variation in spacing still interferes with proper fin forming and attaching, even at a close intervening distance, one of the units may be made self-aligning axially to match tube grooving with tube forming and attaching, but this complicates the design.

Furthermore, due to an uneven wall thickness, or even a slight bow or bend in the tube 20, a twisting and whipping action may be set up in the tube grooving operation. This is minimized if the tube grooving and fin forming and attaching units are kept as close together as possible.

As for the placement of fin forming disc 144 and attaching discs 151 as close together axially as possible, this is dictated by the desirability of directly inserting the fin material, as formed between roll 173 and disc 144, into a groove 21 of the tube, so that as it enters between the attaching discs 157 of the next arbor it is squeezed tight between the groove defining ribs of the tube, being later subjected to the action of attaching discs 157 on arbor 1. However, at the start of finning of a tube, or after passage of a tube's plain, ungrooved end, there must be a short unfinned but grooved section into which the attaching discs can be inserted when the unit closes on the tube. The attaching discs on all three arbors must be down at the roof of the tube groove or the start of the fin cannot be formed correctly. It cannot be squeezed tightly between the tube ribs, and the first few fin turns will be loose and oversize, or succeeding fins might simply ride on top of the ribs.

The attaching discs 157 on arbor 1 are necessarily spaced to the right of forming disc 144 to accommodate the backing disc or collar 174 for discs 144, but this necessary axial spacing should be kept as slight as possible. It is to be noted that the discs 157, 167 on arbors 2 and 3 are of smaller diameter than those on arbor 1. This makes it possible to fin a tube of small root diameter at its grooves, without interference of the several grooving and fin attaching assemblies.

FIGS. 21 through 26 illustrate a further refined and alternate embodiment of the invention, in which provisions are made not only to drive the three tube grooving units of the apparatus positively and at equal speed, such grooving unit on arbor 1 being generally designated 181 and those on arbors 2 and 3 designated 182, but also to positively drive the forming disc on arbor 1, designated 183, positively and at a rotative speed greater than the speed of the grooving units 181, 182.

In the first place, as indicated before, each of the grooving arbors employs a considerable number of grooving discs. This is desired because of the fact that considerable material of the tube must be displaced in forming the multiple grooves 21, and the multiplicity of progressive-diameter discs on each arbor facilitates this displacement, as well as enables the units 181, 182 to stand up best under high speed production.

Grooving disc sets of this type on all three arbors 1, 2 and 3 will automatically center the tube 20 without recourse to supporting rollers or idlers. The positive drive of all three sets at equal speed maintains a correct spacing of grooves and ribs and the tube grooves and ribs throughout the full length of the tube, which may not be the case if even only one set is not driven and is only idling. Spacing may change on the same tube, and slippage will be encountered. Further, the likelihood of disc breakage is increased, and the fin forming and attaching operation is made more difficult.

In instances when the fin material cannot simply be drawn under tension on the tube and correctly applied to the tube grooves, requiring preforming fin roll and disc provisions of the sort above described, it is in most cases highly desirable that the fin be preformed at a different speed from the tube grooving speed, even though the speed of the fin attaching discs will probably approximate the tube grooving speed.

Thus, as an example, if the tube 20 has a 1″ outside diameter, and the tube grooving disc sets 181, 182 have an average 5″ outside diameter, the tube will make about five rotations to one rotation of the discs. The circumference of the 1″ diameter tube is 3.14″, so that in one rotation (3.14″) of the tube, 4.7″ of straight strip material S is to be formed around the tube. Therefore, the strip must move faster to the extent of about 50% than the linear speed of rotation of the tube. Considerations relating to the radial thinning out of a strip under the action of the forming roll and disc, and of the use of a minimum amount of metal for the desired fin outline, also apply.

As shown in FIGS. 21, 22 and 23, the provisions for angularly adjusting the mounting bracket 131 of this embodiment of the invention, generally designated by the reference numeral 185, may comprise in addition to the studs 177 and arcuate slots 176 of the embodiment of FIGS. 19 and 20 (corresponding parts and relationships being designated by corresponding reference numerals, and not therefore described in further detail), an integral upstanding lug 186 on the bracket 131 received between adjustable set screws 187 carried by the spacer block 129.

The bracket 131 is provided with an integral, angularly offset extension 189 which, as shown in FIGS. 21 and 22, rotatively mounts in a suitable way an intermediate gear 190. Gear 190 meshes with and is driven by a power input gear 191 of the grooving and fin attaching mechanism 185. For the purpose of mounting gear 191 (FIG. 23), the mounting bracket extension 189 has an integral, rearwardly extending bearing boss 192 receiving ball bearings 193 by which a shaft 194 carrying drive gear 191 is mounted. The shaft extends externally and is provided with a key or spline 195, by which the shaft is connected to a suitably variable speed drive device (not shown) as through universal driving connections (also not shown).

Referring to FIG. 22, the intermediate gear 190 meshes with a pinion 197 which is mounted by a bushing 198 on the arbor 1 for rotation relative thereto; and the forming disc 183 is keyed or otherwise fixed to pinion 197 for rotation therewith at a rotative speed greater than that of the arbor 1, and of the tube grooving disc set 181 associated with that arbor.

In order to mount the disc set 181, arbor 1 has an integral enlargement 200 at its rear end, this enlargement being shouldered to receive an axial thrust bearing 201 against which the fin forming roll 173 abuts. The discs of the grooving set 181 are assembled between a shoulder 202 on enlargement 200 which sustains the bearing 201 and a clamp collar 203. Clamp and lock nuts 204, 205 threaded on the enlargement hold the collar and disc set in fixed driving relation to arbor 1.

For the drive of the arbor, its rear enlargement 200 has an axial, rearwardly opening bore 207 which is splined to drivingly receive the forward splined end 208 of a drive shaft 209. Shaft 209 is journaled in a housing 210 fixed to the mounting bracket 131, as by roller bearings 211 and a spacing sleeve 212; and the shaft 209 projects outwardly of the housing 210, where it is provided with a key or spline 213. This spline or like driving provision is, like that of the gear shaft 194 which drives disc 183, employed to connect the arbor-driving shaft 209 with a suitable variable speed drive unit (not shown) as through universal coupling means (also not shown).

Arbors 2 and 3 of the apparatus have similar provisions for driving their respective tube grooving disc sets 182, as well as the groove sizing, fin attaching and fin straightening discs keyed on those respective arbors. Briefly, such provisions comprise roller bearings 215 and a bearing spacing sleeve 216 mounting an extension 217 of the arbors 2 and 3 within a housing which is constituted by a rearwardly extending tubular boss integrally formed on an adjustable bearing bracket 218. If desired, a bearing 219 may be provided on bracket 218 outboard of the grooving disc set 182 to back up the respective arbors 2 and 3, by engaging the sleeve 168 which spaces the set 182 from the sizing discs 167. Bearing 219 is carried by a movable slide 220 (FIG. 22) by which the respective arbors may be moved in and out on radii of the axis of tube 20, as the requirements of the finning operation dictate, and in particular when plain ended or interrupted fin tube lengths are to be formed.

Arbor extension 217 also has external spline means 221 by which it is connected by suitable coupling provisions to the variable speed drive unit referred to above (not shown), and by which the arbors 2 and 3 are positively driven at rotative speed equal to that of the arbor 1, the grooving disc sets 181, 182 being accordingly driven in the same fashion.

FIGS. 21 and 22 show a central mandrel 222 about which the tube 20 passes axially in the formation of the grooves 21.

FIG. 24 of the drawings illustrates details of an improved mounting for the disc backing rollers 145 for forming discs 183. As freely journaled on radial pins 223, the rollers run on a race of bearing 201, referred to above, the other race of which abuts the shoulder 202 on the arbor enlargement 200 (per FIG. 22). A supporting ring 225 pinned on arbor 1 supports the fin forming roll 173. The gib support for roll 173 is shown at 226. In all of FIGS. 18 through 26, the forming roll is non-driven, being rotated under frictional force by the forming disc and, in the case of FIGS. 19, 20 and FIGS. 21–26, a supporting ring such as the ring 225.

The reference numeral 227 in FIG. 21 generally designates a spring loaded, toggle type of clamp mounted on bracket 131 for engaging the flat sides of the fin strip material S as it enters the machine and applying tension to the strip. The purpose of this is to enable the preformed fin to be brought quickly down into the groove 21 of tube 20, at the start of an operation, before the fin reaches the attaching discs on arbors 2 and 3. As soon as the beginning of the fin is securely clamped by the attaching discs between the groove-defining ribs of the tube, the clamp 227 is released to remove the additional tension. Details of the toggle tension clamp device constitute no part of the invention. It may be considered as having an operating arm 228 suitably mounted at 229 and adapted to operate a movable jaw 230 through toggle provisions (not shown) to clamp the strip.

As illustrated in FIGS. 21, 25 and 26, the apparatus is also equipped with an adjustable fin strip guide 232, by which the strip S is accurately guided into the bite of the forming roll 173 and disc 183. This comprises a plate 233 mounted by means of studs 234 and vertical slots 235 for vertical adjustment relative to mounting bracket 131. Carbide inserts 236, 237 carried by the plate 233 guide the strip S.

Mounting bracket 131 is also equipped with a further fin guide 239 (see FIG. 26), which guides the fin from the forming roll 173 and forming disc 183 to position between the first and second attaching discs 157 on arbor member 2.

The embodiment of FIGS. 21 through 26 shows relatively simple provisions for the positive drive of the fin rolling members in a desired speed relation to the grooving disc sets 181, 182. FIGS. 27, 28 and 29 illustrate an alternative arrangement, employing a gear train, generally designated by the reference numeral 242, mounted forwardly of the arbor mounting bracket 131. Only essential components are shown. In this arrangement, the fin forming disc, designated 243, is keyed or otherwise fixedly secured on the hub of the gear or pinion 244, which idles on the arbor 1 forwardly of bracket 131. A further driving gear 245 is, on the other hand, keyed or otherwise fixedly secured to arbor 1 to rotate therewith. Fin attaching discs 246, shown as two in number, also rotate with arbor 1, either being keyed directly to the latter or, as illustrated in FIG. 28, to a hub on gear 245. An axial thrust bearing 247 is interposed between the inner disc 246 and the idler gear 244.

Bracket 131, as shown in FIGS. 27 and 29, supports a stub shaft 249, upon which a gear 250 idles, being in mesh with the driving gear 245 on arbor 1; and gear 250 also meshes with a pinion or gear 251 which, as shown in FIGS. 27 and 28, is axially aligned with a further gear 252 of larger diameter. The gears 251, 252 rotate as a unitary gear set about a stub shaft 253, upon which they are mounted by suitable bushing provisions 254. Shaft 253 is fixedly mounted by means of a supplemental bracket 255 mounted to the top of the main arbor and shaft bracket 131.

The larger diameter gear 252 meshes with a gear or pinion 257 idling upon a still further stub shaft 258 carried by bracket 131; and gear 257 meshes with the idler 244 on arbor 1, to which fin forming disc 243 is secured. The train of gear drive is from driving gear 245 to idler 250, thence to the smaller diameter gear 251 on stub shaft 253, driving the larger diameter gear 252. Gear 252 in turn meshes with idler 257 and, through the latter, drives the disc carrying idler 244 on arbor 1. Thus a change gear arrangement of this sort enables the driving of the tube grooving disc set 181 on arbor 1, as well as the fin forming disc 243 on the arbor, both positively but in varying speed relationships as desired.

FIG. 30 is a view in broken line section similar to FIG. 22, showing a special fin attaching head 262 having provisions for the separate vertical adjustment thereof in the radial sense relative to the fin rolling and forming provisions otherwise associated with the arbor 1. Such head may comprise an outboard bearing casting 263 having a slot 264 receiving a bolt or stud 265 which threadedly takes into the main mounting bracket 131, thus enabling the head 262 to be adjusted radially or upwardly as desired relative to the fin forming disc 266 and forming roll 267 on the arbor 1. A set screw 268 abuts the head 262 in the adjusted position of the latter.

Fin attaching discs 270 are fixedly attached to a supplemental arbor 271 which is journaled by ball bearings 272 in the head casting 263; and a driving gear 273 permits the variable speed rotation of arbor 271 relative to that of the main arbor 1 as desired. The arbor 1 may comprise a tubular member 275 journaled in the main bracket structure and internally receiving for rotation therewith an axial extension of a clamping disc 276, by which the fin forming disc 266 is clamped to arbor member 275. A drive gear 278 is keyed to arbor member 275 for the drive of the forming disc 266 in the variable speed manner referred to above.

The special fin attaching head 262, as mounted for individual vertical adjustment, can be opened and closed along with the main arbor carrying the fin forming provisions relative to the tube being grooved and equipped with fins. Further structural fetaures of the embodiment of FIG. 30 represent variations of provisions such as have been described in detail in connection with earlier embodiments, hence need no further specific identification or description. However, in this embodiment, the fin rolling, forming and attaching instrumentalities associated with arbor 1 are shown as employed in conjunction with a special separate grooving head, generally designated 282, including a suitably journaled shaft 283 to which a set of tube grooving discs 284 is attached. This is a standard assembly employing grooving discs of smaller diameter than the forming and attaching discs, and may be separately cam operated to open and close relative to the tube.

The embodiment of FIG. 30 is a combination one which may be employed in tube grooving, fin forming and attaching operations for producing finned tubes with plain end sector or for producing skipped finning, and also for finning the complete tube throughout its length. As in the other embodiments, arbor drives are connected in common to a suitable main variable speed drive unit (not shown) so that proportional speeds for the various operations can be maintained properly at all times.

In the operation of the apparatus in accordance with FIG. 30, and assuming that it is desired to produce a tube having a plain ungrooved end, the operation of grooving the tube through the agency of the grooving disc set 284, and other coacting grooving sets on the arbors 2 and 3 driven therewith, as described above, is started with the plain end of the tube extending forwardly past the grooving discs. These discs may be turning either before or after the heads carrying arbors 1, 2 and 3 have been brought onto the tube; however, at this time, the fin forming and attaching units are in an open or spread position to let the plain tube end section pass therethrough. When the first grooves are beneath such forming and attaching discs, the machine is stopped and such units are brought together with the discs thereof engaging the forward groove formations of the tube.

The fin strip material is inserted between the forming roll 267 and forming disc 266, and operation of the machine is again started at slow speed, with the discs of all driven units driven at their correct speed, although the attaching discs may also turn as idlers under pressure against the tube, so long as the grooving discs are driving the tube. In order to bring the leading end of the preformed fin quickly down into the groove 21 of the tube, before the same reaches the attaching discs on arbors 2 and 3, the strip is preferably held back under added tension by means of a releasable clamp device such as is shown in FIG. 21 and generally designated 227. However, this clamp is released just as soon as the leading end of the fin material is securely clamped between the ribs of the tube by the attaching discs.

The combined operations are now continued at fast speed until the tube is grooved to the correct length, whereupon a limit switch (not shown) may be employed to open the grooving heads of the tube, by suitable means not germane to the invention, leaving the remainder of the tube plain. However, if the attaching discs have only been used as idlers during the tube grooving phase, they must now be engaged with the tube and fin material to drive the tube rotatively the remainder of the way. Fin forming and attaching operations continue to the end of the grooving 21 of the tube, whereupon the machine is halted automatically and all forming and attaching units opened up, by appropriate mechanism not part of the invention. The fin is then cut off and the finished tube removed.

Thus far, all embodiments of the invention relate to a three arbor type of apparatus for the fin forming and attaching operation. This type of equipment is suited for use in the forming and attachment of fins of relatively great radial width, and is more or less restricted to operation on larger diameter tube sizes, since the discs on the arbors oppose one another and interference must be avoided. Smaller tubes, for example of a ⅜ inch groove root diameter and a ⅜ inch fin width will require smaller diameter discs to bring them down to the root diameter, while at the same time preventing the same from hitting one another. The arbors and discs for this reason, especially those of the fin forming unit, may become so small and weak that they cannot stand the high pressure incident to forming and rolling.

In such case, a two arbor type of unit, with arbors diametrically opposed to one another across the axis of the tube may be employed, which will permit the use of discs of as large diameter as possible without possible interference. A unit of this type is depicted as the modified embodiment of FIGS. 31 and 32 of the drawings. It is to be understood that a two arbor unit of this type can also be used for the finning of larger diameter tubes, provided driving forces remain constant and the tube can be kept perfectly round and straight during the operation.

As shown in FIGS. 31 and 32, the main forming and attaching arbor, here specially designated 1′, is, as in other embodiments, connected by suitable provisions to an appropriate variable speed drive unit (not shown). It has keyed thereto an appropriate radially flanged collar 286, to the flange of which the fin forming disc 287 is keyed or otherwise fixedly secured. Disc 287 has an annular rolling surface 287a at an angle to a radial plane. The fin attaching discs 288 are shown as fixedly attached to a pinion or gear 289, adapted to be positively driven at variable speeds in relation to arbor 1′ from the variable speed unit mentioned above through the agency of further gears, to be described. A groove sizing disc 290, fin attaching discs 291 and fin straightening discs 292 (if needed) are shown as applied to the coacting, diametrically opposed arbor, designated 2′, which is driven coordinately with the arbor 1′, by means similar to those described above in connection with earlier embodiments.

The fin forming roll 293 of the two-arbor embodiment of FIGS. 31 and 32 is of frusto-conical, radially inwardly convergent cross section for rolling the fin material in engagement with the mating inclined annular surface 287a of disc 287. A pair of disc back-up rollers 294, which function in the manner of the rollers 50, 51 and 145, are provided, being sustained by suitable radial and axial bearing provisions 295, 296 generally similar to those associated with other embodiments of the invention. The roll 293 and rollers 294 are journaled on radial axes in a fixed though angularly adjustable bracket member 298, and are engageable with the fin material in coaction with the forming disc 287 to roll-form the material prior to attachment by the discs 288, 291.

In order to maintain the tube 20 truly centered, the embodiment of FIGS. 31 and 32 employs a pair of tube guiding idlers 300 which are diametrically opposed to one another on opposite sides of the tube, as shown in FIG. 31, i.e., with the axes thereof in a horizontal plane normal to the plane through the axes of the opposed tube forming and attaching arbors 1′, 2′.

Other provisions of the embodiment of FIGS. 31 and 32 include an intermediate gear 302 meshing with a drive gear 303 and with the arbor gear 289 for the independent drive of forming disc 287 and attaching discs 288, as described above. There are also provided a spring loaded adjustable toggle clamp 305 for the fin strip material, similar to the arrangement of FIG. 21, and provisions such as are generally designated 307 in FIG. 32 for the application of adjustable spring pressure to the fin forming means.

As indicated above, the backing rollers 294 for the fin forming disc 287 are, as shown in FIG. 31, of the same shape as the fin forming roll 293. They act between disc 287 and the bearing structure 296 in the manner described in the earlier, three arbor types of machine.

As also shown in FIG. 31, the disc-like tube back-up rollers 300 are each mounted upon an upper journal portion 309 carried by an upright arm 310, which arm is offset 90° at its lower end and pivotally mounted at 311 to a supporting frame or head 312 for the bottom groove sizing, fin attaching and fin straightening disc set 290, 291, 292. The roller journaling member 309 is mounted for vertical sliding adjustment on arm 310 by gib means, generally designated 314; and member 309 is provided with an outwardly projecting boss or lug formation 315, against which a set screw 316 bears upwardly to sustain the member 309 and back-up rollers 300 in the adjusted positions, the set screw 316 being threadedly received in a lug 317 integral with the arm 310.

The boss formation 315 journals a roller 319, which is outwardly sustained by an adjustable stop block 320 mounted to slide in a top recess 321 of a fixed part 322 of the machine frame, being guided for a horizontal adjusting movement by means of bolts or studs 323 on this frame part extending through an elongated slot 324 in the stop block 320. A stop screw 325 threaded in an upright lug 326 on frame part 322 abuts the rear of the stop member 320, thus holding the latter in a desired adjusted position, in which it in turn sustains roller 319 and holds the arm 310 and back-up roller 300 in proper position at the side of the tube 30. A coiled tension spring 327 acts between the frame part 322 and arm 310 to urge the latter outwardly, maintaining engagement of the arm assembly with stop block 320 when the latter is swung outwardly to disengage rollers 300 from the tube.

Angular adjustment of the fin forming roll 293, for the purpose of offsetting its axis somewhat from the line through the axes of arbors 1′ and 2′, is permitted by the provision of arcuate slots 329 in the supporting bracket 298 by which the forming roll 293 and back-up rollers 294 are carried, these slots receiving clamp bolts or studs 331 carried by a fixed machine part, such as a front bearing flange 332 upon which the intermediate gear 302 is journaled, and in which flange the upper arbor and associated parts also have bearing (FIG. 32). Adjustable set screws 333 and 334 lock the fin forming bracket 298 in its adjusted position. The toggle clamp device 305 is mounted upon this bracket, and the bracket 298 is provided with an adjustable strip guide 336 similar to the device 232 of the embodiment of FIGS. 21–26. Likewise, the bracket 298 also carried an adjustable fin guide 337, similar to the guide 239 of the last named embodiment, for the purpose of guiding a formed fin between the first and second attaching discs 291 on arbor 2'.

FIGS. 33 and 34 illustrate a further modified embodiment of the invention, generally designated 340, in which the fin forming roll 341 and coacting forming disc 342 are proportionately driven (if it is desired to drive the disc 342 positively) in a somewhat different fashion than in the embodiments described above. In this case, a suitable bearing yoke 343 is attached to the machine frame, yoke 343 receiving at its top a ball bearing 344 journaling a power input shaft 345. Shaft 345 can either be driven directly from a separate source, or by means of a gear 346 keyed thereon and suitably connected to a variable speed drive unit (not shown), by which another arbor or arbors of the apparatus are driven for the tube grooving and attaching operations.

A back-up roller 348 for fin forming disc 342 is mounted to idle relative to shaft 345 directly beneath the boss 349 of yoke 343 which receives the bearing 344, as by means of a roller bearing 350. Back-up roller 348 acts between disc 342 and further bearing provisions (to be described) coaxial with the latter, such bearing provisions being generally designated 352.

Yoke 343 is formed to provide a pair of outboard bearing bosses 354, 355, the former of which fixedly receives the right-hand end of a stationary shaft 356, with a threaded end 357 of the shaft engaged with the boss to adjust axial pressure on forming disc 342. This pressure is transmitted through a spring device 358, which urges a collar 359, angularly fixed but axially slidable on shaft 356, in the axial direction. An axial thrust bearing 360 rearwardly sustains a gear 361, such as is driven from an intermediate gear in the manner of the other embodiments; and fin attaching discs 362 are shown mounted upon an axial shoulder of gear 361 to idle relative to the latter.

Fin forming disc 342 is shown as keyed at 364 to gear 361 to rotate therewith, although this disc may also be an idler, if desired. A bushing 365 mounts this disc and gear set to idle on stationary shaft 356.

Shaft 356 has a reduced diameter pilot 367 on its inner end, which is reecived in a bore of an integral formation 368 of yoke 343, in which the power input or drive shaft 345 is further journaled by means of a bushing 369. A diametrically opposed bore of the same formation 368 similarly receives a reduced diameter pilot 370 of a stub shaft 371. Shaft 371 is mounted in rotatively fixed relation to the bearing boss 355 at the right of yoke 343 (FIG. 33) although, if desired, an adjustable compression spring unit 373 may be provided to act axially against shaft 371 for the purpose of adjusting fin forming pressure from this end.

A collar 374 fixed on shaft 371 rearwardly sustains the bearing unit 352, against which the fin back-up roller 348 abuts, as well as the fin forming roll 341.

Roll 341 is fixedly secured to the bottom end of drive shaft 345 for positive rotation by the latter, although back-up roller 348 idles on the shaft; and it is seen that upon such rotation the fin is preformed at any desired speed in relation to the drive speed of the grooving and fin attaching means (not shown) contemplated to be associated with the head 340 and with the other driven arbor or arbors of the apparatus (not shown in FIG. 33).

The embodiment of FIG. 35 is a further modified one, generally designated 376, which makes use of a very large diameter, driven fin forming roll, generally designated by the reference numeral 377. It comprises a large diameter annular rolling member or ring 378 which coacts with the fin forming disc 379 in the rolling and forming of the fin. Disc 379 may be piloted on a fixed supporting arbor 380 in the manner illustrated and described in connection with FIGS. 33 and 34, and driven in a corresponding fashion, as desired, in association with attaching discs (not shown).

Forming roll 377 further comprises a ring bevel gear 382 concentrically secured to the rolling ring 378. Gear 382 is meshingly engaged by a bevel pinion 383 secured to a shaft 384 mounted by a ball bearing 385 in a bearing yoke 386 of the apparatus, which is suitably mounted by means (not shown) for motion of the unit 376 in separating from or approaching the tube to be rolled. As driven from bevel pinion 383, the bevel pinion type roll 377 is sustained from beneath by diametrically opposed bearing gibs 388.

The reference numeral 390 designates a disc back-up roller or ring of unit 376, which rolls in back-up engagement with forming disc 379 and is diametrically oppositely backed by the axial thrust bearing 391, which in turn abuts a flanger collar 392 telescoped in yoke 386 coaxially of the bevel pinion drive shaft 384. Back-up ring 390 is sustained in its rotation from beneath by yoke 386, which is provided with a slot 394 through which the ring projects to engage forming disc 379.

In the embodiment of FIG. 35, a set of tube grooving discs, generally designated 396, is disposed to operate inside the fin forming roll or ring 377. To this end the disc set 396 is secured to a shaft or arbor 397 journaled by ball bearings 398 in a grooving head 399. This head is mounted by appropriate means (not shown) for radial movement to and from the tube being grooved. A pinion 399' is keyed on shaft 397 between the bearings 398, this pinion being driven by an intermediate gear 400 in the manner described above in connection with other embodiments involving the intermediate gears 190 and 302.

The embodiment 376 of FIG. 35, in employing a very large diameter fin forming roll, enables the separately driven tube grooving disc set to be brought within the forming roll 377, thus bringing the grooving disc set 396 axially closer to the members which roll and preform the fin, i.e., ring 378 and disc 379. As in earlier embodiments, the disc set 396, employing grooving discs of small diameter, may be operated in conjunction with two other arbor-borne grooving sets. However, as for the attaching discs other than those of the unit 376, only one set is employed, by preference, in order to avoid possible interference with the large diameter forming roll 377.

In all of the embodiments thus far described, the design is based upon the preforming of the fin between forming roll and disc member, as a separate operation combined with tube grooving and/or fin attaching operations. Fin materials of certain metals and sizes require preforming practically down to the tube diameter; while others need little preforming. Still other metals and fin sizes require no preforming, and can be fin-formed directly from a straight strip simply by holding the latter under tension alone. It is with the handling of fin materials of such metals, widths and thicknesses that the simplified embodiments of FIGS. 36, 37 and 38 deal.

In the first of these, shown in FIG. 36 and designated 402, a set of tube grooving discs 403 is fixedly associated on arbor 1 with a rugged fin forming collar or roller 404 and with a fin guiding and forming disc 405, the latter being urged resiliently axially by a spring unit generally designated 406, with washer and clamp and lock nut means at 407 to adjust the bias on the disc 405. The provisions of this sort are generally similar to those earlier described.

In the embodiment of FIG. 36, grooving discs 403, fin forming collar 404 and disc 405 are driven positively by arbor 1 at the same speed. They coact with grooving discs 409 and guiding and attaching discs 410 on arbors 2 and/or 3. Suitable devices to apply additional tension to the fin strip and to guide the same in entering and/or leaving the bite of forming roller or collar 404 and disc 405, such as are employed in the embodiments of FIGS. 19, 21 and 31, may be employed. However, essentially the driving an drotating force of the grooving disc sets 403, 409 is relied on to pull the strip while forming the same and rolling it into the grooves of tube 20.

FIG. 37 of the drawings illustrates a still further modified embodiment, in which the tube grooving disc set, designated 414, is keyed to arbor 1, but in which the fin guiding and forming collar 415, as well as forming and attaching discs 416, 417, respectively, as keyed to an integral flange sleeve 418 of the collar, idle on arbor 1, being journaled on the latter by a bushing 419. An axial thrust bearing 420 is interposed between forming collar 415 and the grooving disc set 414; and adjustable resilient thrust is applied to collar 415 and discs 416, 417 through the agency of a ball bearing 421 and adjustable spring biasing unit, generally designated 422, such as has been previously described in connection with other forms. As in the embodiment of FIG. 36, reliance is placed upon strip tension to form the fin helically and apply and attach the same to the tube grooves.

The embodiment of FIG. 38 closely resembles that of FIG. 37, so that corresponding reference numerals, primed, will be used to designate corresponding parts. This modification is one designed for the application of skipped finning and for plain end tubes, and employs a removable outboard bearing 424 for arbor 1. It's operation is as described above in reference to the plain end and skipped fin operations.

In this case, the arbor 1 is driven positively by means of a gear 425 keyed thereon, which gear may be driven through an intermediate gear, as in previously described embodiments; and the set of forming collar 415′, forming disc 416′ and attaching discs 417′ are axially sustained by the bearing 420′ abutting gear 425. A conventional tube grooving head 427 equipped with small diameter grooving discs 428 is employed in the embodiment of FIG. 38, rather than associating the grooving discs directly with the arbor 1, as in FIG. 37.

Thus it is seen that, whether the nature of the fin material is such that the metal of which it is made, its radical width, its axial thickness and like considerations require its preforming by thinning or tapering the same as an incident to its helical formation and application to the tube, or whether the nature of the strip is such as not to require preforming in respect to its width or taper, being simply formed helically under tension, the invention affords many embodiments of apparatus to meet the varying requirements. Considerable latitude is afforded as to whether forming roll, forming disc and attaching disc means are to be positively driven or not, and, if driven, at the same speed or a speed varying with that of the grooving means; and in all embodiments, various provisions are made for adjustment of pressures, positional relationships, and the like, to best accommodate the equipment to the situation.

The drawings and the foregoing specification constitute a description of the improved combination fin-forming and fin-attaching methods and apparatus in such full, clear, concise and exact terms as to enable any person skilled in the art to practice the invention, the scope of which is indicated by the appended claims.

What I claim as my invention is:

1. Apparatus for use in attaching fin strip material to an elongated, helically grooved tube or like member advancing axially in the direction of its length, comprising means disposed forwardly in the direction of said advance to receive fin strip material for application to the grooving of said member, including coacting first and second rotary members between which said strip material is received under substantial force in the direction axially of the first thereof, the second rotary member being mounted to rotate on an axis at an angle to the axis of the first, and means for exerting adjustable resilient force on said first member in the direction of its axis and toward said second member to apply and control the force exerted on the fin material by said first and second members.

2. Apparatus for use in attaching fin strip material to an elongated, helically grooved tube or like member advancing axially in the direction of its length, comprising means disposed forwardly in the direction of said advance to receive fin strip material for application to the grooving of said member, including coacting first and second rotary members between which said strip material is received under substantial force in the direction axially of the first thereof, the second rotary member being mounted to rotate on an axis at an angle of about 90° to the axis of the first, means for adjusting the axis of the second rotary member angularly about the axis of the first member to vary the zone of engagement of the fin material between said rotary members.

3. Apparatus for use in attaching fin strip material to an elongated, helically grooved tube or like member advancing axially in the direction of its length, comprising means disposed forwardly in the direction of said advance to receive fin strip mterial for application to the grooving of said member, including coacting first and second rotary members between which said strip material is received under substantial force in the direction axially of the first thereof, the second rotary member being mounted to rotate on an axis at an angle of about 90° to the axis of the first, means for exerting adjustable resilient force on said first member in the direction of its axis and toward said second member to apply and control the force exerted on the fin material by said first and second members, and means for adjusting the axis of the second rotary member anguarly about the axis of the first member to vary the zone of engagement of the fin material between said rotary members.

4. Apparatus for use in applying a fin strip externally to a tube advancing axially in the direction of its length, comprising means to supply elongated fin material, a fin engaging disc having a peripheral, axially facing rotatable surface to roll the fin, said disc being mounted to rotate on an axis laterally offset from and paralleling the axis of the tube, and fin rolling means providing a rotatable rolling surface adjacent and facing said rolling surface of said disc and mounted to rotate on an axis at an acute angle to said disc axis and the axis of said tube, said supply means being disposed to introduce said fin material between said facing surfaces.

5. Apparatus for use in applying a fin strip to a tube advancing axially in the direction of its length, comprising means to supply elongated fin material, a fin rolling disc of relatively thin axial cross-section having an axially facing rotatable rolling surface in laterally offset relation to said tube to roll material supplied by said supply means, a fin forming roll providing a peripheral rotatable rolling surface adjacent and facing said rolling surface of said disc, and means mounting said roll to rotate on an axis at an angle to the axis of said tube, comprising a fixed support member having means providing a bearing support for said roll for the rotation of the roll at said axis angle, said roll being exposed at a side of said support member to face and coact with said rolling surface of said disc, in the rolling of said fin material between said roll and disc rolling surfaces under substantial pressure, said bearing support having radial and axial thrust bearing means sustaining said roll against tilt and bracing said disc under forces developed in rolling.

6. Apparatus for use in applying a fin strip to a tube advancing axially in the direction of its length, comprising means to supply elongated fin material, a fin rolling disc of relatively thin axial cross-section having an axially facing rotatable rolling surface in laterally offset relation to said tube to roll material supplied by said supply means, a fin forming roll providing a peripheral rotatable rolling surface adjacent and facing said rolling surface of said disc, and means mounting said roll to rotate on an axis at an angle to the axis of said tube, comprising a fixed support member having means providing a bearing support for said roll for the rotation of the roller at said axis angle, said roll being exposed at a side of said support member to face and coact with said rolling surface of said disc, in the rolling of said fin material between said roll and disc rolling surfaces under substantial pressure, said bearing support having radial and axial thrust bearing means sustaining said roll against tilt and bracing said disc under force developed in rolling, said roll being located between said disc and said bearing means and adjacent the zone of sustaining action of the latter.

7. Apparatus in accordance with claim 6, in which said bearing support comprises a seat on said support member internally receiving said roll for rotation on an axis at 90° to that of said tube.

8. Apparatus in accordance with claim 6, and further comprising means to adjust the axis of said roll angularly about the axis of said disc.

9. Apparatus in accordance with claim 6, in which said bearing support comprises a seat on said support member, said roll having a bearing formation on an outer axial surface thereof and said seat having means supporting a bearing for engagement and coaction with said formation, and further comprising means to adjust the axis of said roll angularly about the axis of said disc.

10. Apparatus for use in applying a fin strip to a tube advancing axially in the direction of its length, comprising means to supply elongated fin material, and fin rolling means to roll material supplied by said supply means, including a fin rolling member providing a tapered peripheral rotatable rolling surface, and means mounting said rolling member to rotate on an axis at an angle to the axis of said tube, the axis of said tapered surface being in laterally offset relation to that of the tube.

11. Apparatus for use in applying a fin strip to a tube advancing axially in the direction of its length, comprising means to supply elongated fin material, and fin rolling means to roll material supplied by said supply means, including a fin rolling member providing a tapered peripheral rotatable rolling surface, and means mounting said rolling member to rotate on an axis at an angle to the axis of said tube, the axis of said tapered surface being in intersecting relation to that of the tube.

12. Apparatus for use in applying a fin strip to a tube advancing axially in the direction of its length, comprising means to supply elongated fin material, and fin rolling means to roll material supplied by said supply means, including a rolling disc having an axially facing rotatable rolling surface in laterally offset relation to said tube, a fin rolling member providing a tapered peripheral rotatable rolling surface adjacent and facing said rolling surface of said disc, and means mounting said rolling member to rotate on an axis at an angle to the axis of said tube, the axis of said tapered surface being in laterally offset intersecting relation to that of the tube.

13. Apparatus for use in forming and applying a fin strip to a tube advancing axially in the direction of its length, comprising means to supply elongated fin material, a fin forming disc having an axially facing rotatable rolling surface the axis of which parallels and is in laterally offset relation to the axis of said tube to roll material supplied by said supply means, a fin forming roll providing a peripheral rotatable rolling surface adjacent and facing said rolling surface of said disc, and means mounting said roll to rotate on an axis at approximately a right angle to the axis of said tube, comprising a fixed support member having means providing a bearing support for said roller for the rotation of the roll at said axis angle, said roll being exposed at a side of said support member to coact with said rolling surface of said disc, radial and axial thrust bearing means sustaining said roll against tilt under forces developed in rolling, said roll being located between said disc and said bearing means and adjacent the zone of sustaining action of the latter, and at least one thrust bearing roller member journaled on said support member and in rolling engagement with and between said attaching disc and a part of said last named bearing means, said part being an axial bearing element coaxial with said disc.

14. Apparatus for forming fin strip material to a tapered cross sectional outline and attaching the same to an elongated grooved tube advancing axially in the direction of its length, comprising means to receive fin strip material and form and apply the same to the grooving of said tube, including coacting rotary roll and disc members between which said strip material is received under substantial forming force in the direction axially of the disc member, the roll member being mounted to rotate on an axis at an angle of about 90° to the axis of said disc member, means for exerting adjustable resilient force on said disc member in the direction of its axis and toward said roll member to control the forming force on the fin material, means for adjusting the axis of said roll member angularly about the axis of said disc member to vary the zone of engagement of the fin material between said roll and disc members, means to clamp the fin material in the grooving of said tube, as thus formed and applied to the latter, including at least one attaching disc mounted coaxially forwardly of said disc member in the direction of advance of the tube, and means to adjust the axis of said attaching disc radially of the axis of the disc member.

15. Apparatus for use in appling a fin to a tube advancing axially in the direction of its length, comprising means to supply elongated fin material, a fin rolling disc having an axially facing rotatable rolling surface in laterally offset relation to said tube to roll material supplied by said supply means, a fin forming roll providing a peripheral rotatable rolling surface adjacent and facing said rolling surface of said disc, and means mounting said roll to rotate on an axis at an approximate 90° angle to the axis of said tube, comprising a fixed support member providing a bearing support for said roll for the rotation of the latter at said axis angle to coact with said disc rolling surface in the rolling of said fin material, axial thrust bearing means sustaining said roll under forces developed in rolling, and back-up roller means for said rolling disc engaging between the latter and said bearing means.

16. Apparatus for applying a fin to a tube advancing axially in the direction of its length, comprising means to supply elongated fin material, a fin rolling disc and coaxial fin attaching discs, said rolling disc having an axially facing rotatable rolling surface in laterally offset relation to said tube to roll material supplied by said supply means, a fin forming roll providing a peripheral rotatable rolling surface adjacent and facing said rolling surface of said disc, and means mounting said roll to rotate on an axis at an approximate 90° angle to the axis of said tube, comprising a fixed support member providing a bearing support for said roll for the rotation of the latter at said axis angle to coact with said disc rolling surface in the rolling of said fin material, axial thrust bearing means sustaining said roll under forces developed in rolling, and back-up roller means for said rolling disc engaging between the latter and said bearing means, and at least two sets of coaxial fin attaching discs equidistantly spaced from one another and said first named discs about the axis to said tube for coaction with said first named attaching discs in the attachment of the fin material to the tube.

17. Apparatus for applying a fin to a tube advancing axially in the direction of its length, comprising means to supply elongated fin material, a fin rolling disc and coaxial fin attaching discs, said rolling disc having an axially facing rotatable rolling surface in laterally offset relation to said tube to roll material supplied by said supply means, a fin forming roll providing a peripheral rotatable rolling surface adjacent and facing said rolling surface of said disc, and means mounting said roll to rotate on an axis at an approximate 90° angle to the axis of said tube, comprising a fixed support member providing a bearing support for said roll for the rotation of the latter at said axis angle to coact with said disc rolling surface in the rolling of said fin material, axial thrust bearing means sustaining said roll under forces developed in rolling, and back-up roller means for said rolling disc engaging between the latter and said bearing means, and a set of coaxial attaching discs mounted in diametrically opposed relation to said first named discs across the axis to said tube for coaction with said first named attaching discs in the attachment of the fin material to the tube.

References Cited in the file of this patent

UNITED STATES PATENTS

| | | |
|---|---|---|
| 1,850,885 | Lane | Mar. 22, 1932 |
| 1,863,552 | Berg | June 14, 1932 |
| 1,863,553 | Berg | June 14, 1932 |
| 1,930,161 | Dewald | Oct. 10, 1933 |
| 2,604,138 | Harrison | July 22, 1952 |
| 2,661,526 | Bruegger | Dec. 8, 1953 |
| 2,792,050 | Edwards | May 14, 1957 |
| 2,812,794 | Chapman | Nov. 12, 1957 |
| 2,865,424 | McElroy | Dec. 23, 1958 |
| 2,956,335 | Matheny et al. | Oct. 18, 1960 |
| 3,055,082 | Garland | Sept. 25, 1962 |
| 3,089,364 | Lowinger | May 14, 1963 |